United States Patent [19]
Barker et al.

[11] Patent Number: 5,406,289
[45] Date of Patent: Apr. 11, 1995

[54] METHOD AND SYSTEM FOR TRACKING MULTIPLE REGIONAL OBJECTS

[75] Inventors: Thomas N. Barker, Vestal, N.Y.; Joseph A. Persichetti, Boulder, Colo.; Aubrey B. Poore, Jr.; Nenad Rijavec, both of Ft. Collins, Colo.

[73] Assignee: International Business Machines Corporation, Armonk, N.Y.; Colorado State University Research Foundation, Ft. Collins, Colo.

[21] Appl. No.: 171,327

[22] Filed: Dec. 21, 1993

Related U.S. Application Data

[63] Continuation of Ser. No. 64,526, May 18, 1993, abandoned.

[51] Int. Cl.$^6$ .............................................. G01S 13/00
[52] U.S. Cl. ........................................ 342/96; 342/90
[58] Field of Search .................................. 342/90, 96

[56] References Cited

U.S. PATENT DOCUMENTS

| | | | |
|---|---|---|---|
| 3,849,779 | 11/1974 | Boyd | 343/7.4 |
| 3,869,601 | 3/1975 | Metcalf | 235/150.2 |
| 4,042,924 | 8/1977 | Evans et al. | 343/7 |
| 4,768,034 | 8/1988 | Preikschat et al. | 342/90 X |
| 4,823,272 | 4/1989 | Inselberg | 364/461 |
| 4,839,658 | 6/1989 | Kathol et al. | 342/455 |
| 4,975,707 | 12/1990 | Smith | 342/357 |
| 5,058,024 | 10/1991 | Inselberg | 364/461 |
| 5,138,321 | 8/1992 | Hammer | 342/36 |
| 5,170,440 | 12/1992 | Cox | 382/22 |
| 5,202,691 | 4/1993 | Hicks | 342/90 |

FOREIGN PATENT DOCUMENTS

| | | |
|---|---|---|
| 4-113291 | 4/1992 | Japan . |
| 4-198886 | 7/1992 | Japan . |

OTHER PUBLICATIONS

Proceedings of SDI Panels on Tracking, G. Frenkel & B. Fridling (Editors), A. B. Poore and N. Rijavec (Authors), "Multitarget tracking, multidimensional assignment problems, and Lagrangian relation", Institute for Defense, Issue 2, 1991, pp. 3-51 to 3-74.

W. P. Pierskalla, The multi-dimensional assignment problem, Operatons Research, 16 (1968), pp. 422-431.

D. B. Reid, An algorithm for tracking multiple targets, IEEE Transactions On Automatic Control, vol. AC-24, No. 6, Dec. 1979, pp. 843-854.

(List continued on next page.)

Primary Examiner—Mark Hellner
Attorney, Agent, or Firm—Arthur J. Samodovitz

[57] ABSTRACT

A method for tracking objects is disclosed. First a region containing the objects is scanned to generate a multiplicity of sequential images or data sets of the region. A plurality of points in each of the images or data sets corresponds to a respective plurality of the objects. Next, respective figures of merit are determined for assigning the points to the tracks. Next, a k-dimensional cost function is defined which sums the figures of merit for combinations of assignments from the images or data sets. Next, the complexity of the cost function is reduced by Lagrangian Relaxation by permitting a point to be assigned to more than one track and adding a penalty factor to the cost function when a point is assigned to more than one track. The reducing step is iteratively repeated and the resultant penalized cost function is solved. Next, an auxiliary function at a (k−1)-dimension is defined as a function of lower order penalty factors and a solution at the dimension at which the penalized cost function was solved directly. Next, a gradient of the auxiliary function is determined, a step is made in the direction of the gradient to identify a peak region of the auxiliary function and penalty factors at the peak region are determined. The penalty factors at the peak region are used to determine track assignments for the points in the images or data sets. Then one or more of the following actions are taken based on the track assignments: sending a warning to aircraft or a ground or sea facility, controlling air traffic, controlling anti-aircraft or anti-missile equipment, taking evasive action, working on one of the objects.

42 Claims, 5 Drawing Sheets

OTHER PUBLICATIONS

C. L. Morefield, Application of 0-1 integer programming to multitarget tracking problems, IEEE Transactions on Automatic Control, vol. AC-22, No. 3 Jun. 1977 pp. 302-312.

P. Wolfe, Finding the nearest point in a polytope, Mathematical Programming, 11 (1976), pp. 128-149.

A. M. Frieze, A bilinear programming formulation of the 3-dimensional assignment problem, Mathematical Programming, 7 (1974), pp. 376-379.

A. M. Frieze and J. Yadegar, An algorithm for solving 3-dimensional assignment problems with application to scheduling a teaching practice, Journal of the Operational Research Society, 32 (1981), pp. 989-995.

Y. Bar-Shalom, Tracking methods in a multitarget environment, IEEE Transactions on Automatic Control, vol. AC-23, No. 4 Aug. 1978, pp. 618-626.

C. Lemarechal, Bundle methods in nonsmooth optimization, in C. Lemarechal and R. Mifflin, eds. Nonsmooth Optimization ILASA Proceedings 3, Pergamon, Oxford, 1978, pp. 79-102.

R. W. Sittler, An optimal data association problem in surveillance theory, IEEE Transactions on Military Electronics, Apr. 1964, pp. 125-139.

P. Wolfe, A method of conjugate subgradients for minimizing nondifferentiable functions, Mathematical Programming Study, 3 (1975), pp. 147-173.

A. M. Frieze, A bilinear programming formulation of the 3-dimensional assignment problem, Mathematical Programming, 7, pp. 376-379, 1974.

Somnath D., A new algorithm for the generalized multidimensional assignment problem, IEEE International Conf. on Systems, Man and Cybernetics, Chicago 92.

Danchick, R, A Multisensor-Multitarget Data Association Algorithm for Heterogeneous Sensors, IEEE Transactions On Aerospace and Electronics Systems vol. 29, No. 2, Apr. 1993.

Somnath Deb, A S-dimensional assignement algorithm for track initiation, IEEE Systems Conf. Kobe Japan Sep. 1992.

Pattipati, A new relaxation algorithm and Passive Sensor Data Association, IEEE Transactions on Automatic Control vol. 37 No. 2, Feb. 1992 Computer Printout.

M. Held and R. M. Karp, The traveling salesman problem and minimal spanning trees, Part II, Mathematical Programming, 1 (1971) pp. 6-25.

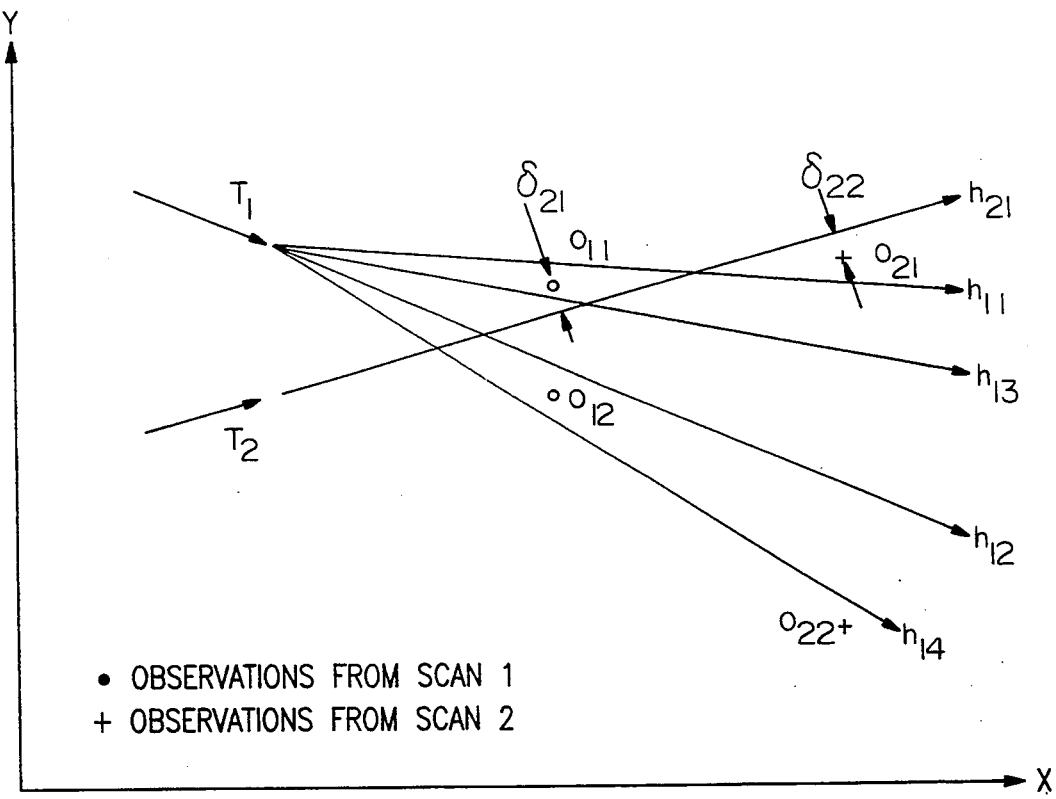

METHOD AND SYSTEM FOR TRACKING MULTIPLE REGIONAL OBJECTS

The application is a continuation of application Ser. No. 08/064,526, filed May 18, 1993, now abandoned.

BACKGROUND OF THE INVENTION

The invention relates generally to computerized techniques for processing data obtained from radar to track multiple discrete objects.

There are many situations where the courses of multiple objects in a region must be tracked. Typically, radar is used to scan the region and generate discrete images or "snapshots" based on sets of returns. In some types of tracking systems, all the returns from any one object are represented in an image as a single point unrelated to the shape or size of the objects. "Tracking" is the process of identifying a sequence of points from a respective sequence of the images that represents the motion of an object. The tracking problem is difficult when there are multiple closely spaced objects because the objects can change their speed and direction rapidly and move into and out of the line of sight for other objects. The problem is exacerbated because each set of returns may result from noise as well as echoes from the actual objects. The returns resulting from the noise are also called false positives. Likewise, the radar will not detect all echoes from the actual objects and this phenomena is called a false negative or 'missed detect' error. For tracking airborne objects, a large distance between the radar and the objects diminishes the signal to noise ratio so the number of false positives and false negatives can be high. For robotic applications the power of the radar is low and as a result, the signal to noise ratio can also be low and the number of false positives and false negatives high.

In view of the proximity of the objects to one another, varied motion of the objects and false positives and false negatives, multiple sequential images should be analyzed collectively to obtain enough information to properly assign the points to the proper tracks. Naturally, the larger the number of images that are analyzed, the greater the amount of information that must be processed.

While identifying the track of an object, a kinematic model describing the object's location, velocity and acceleration is generated. That model provides the means by which the object's future motion can be predicted. Based upon that prediction, appropriate action can be initiated. For example, the military may need to track multiple enemy aircraft or missiles in a region to predict their objective, plan responses and intercept them. Also, commercial air traffic control may need to track multiple commercial aircraft around an airport to predict their future courses and avoid collision. In robotic applications, radar can be used to track a single object which moves relative to the robot (or vice versa) so the robot can work on the object.

Consider the very simple example of two objects being tracked and no false positives or false negatives. The radar, after scanning at time $t_1$, reports objects at two locations. That is, it returns a set of two observations $\{o_{11}, o_{12}\}$. At time $t_2$ it returns a similar set of two observations $\{o_{21}, o_{22}\}$. Suppose from prior processing that the locations $T_1$ and $T_2$ at $t_0$ of two objects are known. Tracks from $T_1$ could be extended through the points in the two sets of observations in any of four ways, as could tracks from $T_2$. The possible extensions from $T_1$ can be described as: $\{T_1, o_{11}, o_{21}\}$, $\{T_1, o_{11}, o_{22}\}$, $\{T_1, o_{12}, o_{21}\}$ and $\{T_1, o_{12}, o_{22}\}$. Tracks can likewise be extended from $T_2$ in four possible ways including, $\{T_2, o_{12}, o_{21}\}$. FIG. 1 illustrates these five out of eight possible tracks (to simplify the problem for purposes of explanation). The five tracks are labeled $h_{11}$, $h_{12}$, $h_{13}$, $h_{14}$, and $h_{21}$.

It was known in prior art to determine a figure of merit for assigning each of the points in the images to a track. The figure of merit is based on the likelihood that the point is actually part of the track. For example, the figure of merit or "cost" may be based on the distance from the point to an extrapolation of the track. FIG. 1 illustrates costs $\delta_{21}$ and $\delta_{22}$ for hypothetical extension $h_{21}$ and modeled target characteristics. The function to calculate the cost will normally incorporate detailed characteristics of the sensor, such as probability of measurement error, and track characteristics, such as likelihood of track maneuver.

FIG. 2 illustrates a two by two by two matrix that contains the costs "c" for each point in relation to each possible track. The cost matrix is indexed along one axis by the track number, along another axis by the image number and along the third axis by a point number. Thus, each position in the cost matrix lists the cost for a unique combination of points and a track. FIG. 2 also illustrates a $\{0, 1\}$ assignment matrix which is defined with the same dimensions as the cost matrix. Setting a position in the assignment matrix to "one" means that the equivalent position in the cost matrix is selected into the solution. The illustrated solution matrix selects the $\{h_{14}, h_{21}\}$ solution previously described. Note that for the above example of two tracks and two snapshots, the resulting cost and assignment matrices are three dimensional. As used in this patent application, the term "dimension" means the number of axes in the cost or assignment matrix while size refers to the number of elements along a typical axis. The costs and assignments have been grouped in matrices to facilitate computation.

A solution to the assignment problem meets two constraints—first, the sum of the associated costs is minimized and second, if no false positives or false negatives exist, then each point is assigned to one and only one track. When false positives exist additional hypothetical paths incorporating the false positives will be generated. The random locations of false positives will in general not fit well with true data and such paths will result in higher costs. When false negative errors exist then the size of the cost matrix must grow to include hypotheses formulated with gaps for the false negatives. The cost of tracks with gaps must be augmented to reflect such gaps. The second criteria must be weakened to reflect false positives not being assigned and also to permit the gap filler to be multiply assigned. With hypothetical cost calculated in this manner then the foregoing criteria for minimization will tend to materialize the false negatives and avoid the false positives.

For a 3-dimensional problem, as is illustrated in FIG. 1, but with $N_1$ tracks, $N_2$ observations in scan 1, $N_3$ observations in scan 2, false positives and negatives assumed, the assignment problem can be formulated as:

$$\text{Minimize:} \sum_{i_1=0}^{N_1} \sum_{i_2=0}^{N_2} \sum_{i_3=0}^{N_3} c_{i_1 i_2 i_3} z_{i_1 i_2 i_3} \quad [1.0a]$$

-continued $$\text{Subject to: } \sum_{i_2=1}^{N_2} \sum_{i_3=1}^{N_3} z_{i_1 i_2 i_3} = 1, \quad i_1 = 1, \ldots N_1 \quad [1.0b]$$

$$\sum_{i_1=1}^{N_1} \sum_{i_3=1}^{N_3} z_{i_1 i_2 i_3} \leq 1, \quad i_2 = 1, \ldots N_2 \quad [1.0c]$$

$$\sum_{i_1=1}^{N_1} \sum_{i_2=1}^{N_2} z_{i_1 i_2 i_3} \leq 1, \quad i_3 = 1, \ldots N_3 \quad [1.0d]$$

$$z_{i_1 i_2 i_3} \in \{0,1\} \quad z_{i_1 i_2 i_3} \quad [1.0e]$$

where "c" is the cost and 'z' is a point assignment.

The minimization equation 1.0(a) specifies the sum of the element by element product of the c and z matrices. The summation includes hypothesis with observation number zero which is the gap filler observation. Equation 1.1(b) requires that each of tracks beginning with points $T_1 \ldots T_{N_1}$ be extended by one and only one hypothesis. Equation 1.1(c) relates to each observation in set 1 and it requires that each observation, except the gap filler, can only associate with one track but because of the 'less than' condition it might not associate with any track. Equation 1.1(d) is like (c) except applicable to observation set 2. Equation 1.1(e) requires that elements of the solution matrix z be limited to the zero and one values.

The only known method to solve Equation 1.0 exactly is a method called "Branch and Bound". That algorithm systematically enumerates a potential solution (ie. a branch of the tree describing all possible solutions) and evaluates the cost of the branch incrementally as it develops. When the developing cost grows to exceed the previously known minimal cost (ie. the bound) then enumeration of the tree branch terminates. Evaluation continues with a new branch. If evaluation of the cost of a particular branch completes, then that branch has lower cost than the previous bound so the new cost replaces the old bound. When all possible branches are evaluated or eliminated then the branch that had resulted in the last used bound is the solution. If we assume that $N_1=N_2=N_3=n$ and that branches typically evaluate to half there full length, then workload associated with 'branch and bound' is proportional to $$\left( n! \mid \frac{n}{2}! \right)^2.$$

This workload is unsuited to real time evaluation.

The Branch and Bound algorithm has been used in past research on the Traveling Salesman Problem. Messrs. Held and Karp showed that if the set of constraints was relaxed by a method of Lagrangian Multipliers (described in more detail below) then tight lower bounds could be developed in advance of enumerating any branch of the potential solution. By initiating the branch and bound algorithm with that tight lower bound, significant performance improvements result in that branches will typically evaluate to less than half their full length.

Messrs. Frieze and Yadagar in dealing with a problem related to scheduling combinations of resources, as in job, worker and work site, showed that Equations 1.0 applied. They went on to describe a solution method based upon an extension of the Lagrangian Relaxation previously mentioned. The two critical extensions provided by Messrs. Frieze and Yadagar were (1) an iterative procedure that permitted the lower bound on the solution to be improved (by "hill climbing" described below) and (2) the recognition that when the lower bound of the relaxed problem was maximized, then there existed a method to recover the solution of the non-relaxed problem in most cases using parameters determined at the maximum. The procedures attributed to Messrs. Frieze and Yadagar are only applicable to the 3-dimensional problem posed by Equations 1.0 and where the cost matrix is fully populated. However, tracking multiple airborne objects usually requires solution of a much higher dimensional problem.

FIGS. 1 and 2 illustrate an example where "look ahead" data from the second image improved the assignment accuracy for the first image. Without the look ahead, and based only upon a simple nearest neighbor approach, the assignments in the first set would have been reversed. Equations 1.0 and the prior art only permit looking ahead one image. In the prior art it was known that the accuracy of assignments will improve if the process looks further ahead, however no practical method to optimally incorporate look ahead data existed. Many real radar tracking problems involve hundreds of tracks, thousands of observations per set and matrices with dimensions in the range of 3 to 25 including may images of look ahead.

It was also known that the data assignment problem could be simplified (without reducing the dimension) by eliminating from consideration for each track those points which, after considering estimated limits of speed and turning ability of the objects, could not physically be part of the track. One such technique defines a cone as a continuation of each previously determined track with the apex of the cone at the end of the previously defined track. The length of the cone is based on the estimated maximum speed of the object and the size of the arc on the cone is based on the estimated maximum turning ability of the object. Thus, the cone defines a region outside of which no point could physically be part of the respective track. For any such points outside of the cones, an infinite number could be put in the cost matrix and a zero could be preassigned in the assignment matrix. It was known for the tracking problem that these elements will be very common in the cost and selection matrices (so these matrices are "sparse").

It was also known in the prior art that one or more tracks which are substantially separated geographically from the other tracks can be separated also in the assignment problem. This is done by examining the distances from each point to the various possible tracks. If the distances from one set of points are reasonably short only in relation to one track, then they are assigned to that track and not further considered with the remainder of the points. Similarly, if a larger group of points can only be assigned to a few tracks, then the group is considered a different assignment problem. Because the complexity of assignment problems increases dramatically with the number of possible tracks and the total number of points in each matrix, this partitioning of the group of points into a separate assignment problem and removal of these points from the matrices for the remaining points, substantially reduces the complexity of the overall assignment problem.

A previously known Multiple Hypothesis Testing (MHT) algorithm (see Blackman, Multiple-Target Tracking with Radar Applications, Chapter 10, Artech House Norwood, Mass., 1986) related to formulation and scoring. The MHT procedure describes how to formulate the sparse set of all reasonable extension hypothesis (for FIG. 1 the set $\{h_{11} \ldots h_{24}\}$) and how to calculate a cost of the hypothesis $\{T_i, o_{1j}, o_{2k}\}$ based upon the previously calculated cost for hypothesis $\{T_i, o_{1j}\}$. The experience with the MHT algorithm, known in the prior art, is the basis for the assertion that look ahead through K sets of observations results in improved assignment of observations from the first set to the track.

In theory, the MHT procedure uses the extendable costing procedure to defer assignment decision until the accumulated evidence supporting the assignment becomes overwhelming. When it makes the assignment decision it then eliminates all potential assignments invalidated by the decision in a process called "pruning the three". In practice, the MHT hypothesis tree is limited to a fixed number of generations and the overwhelming evidence rule is replaced by a most likely and feasible rule. This rule considers each track independently of others and is therefore a local decision rule.

A general object of the present invention is to provide an efficient and accurate process for assigning each point object in a region from multiple images to a proper track and then taking an action based upon the assignments.

A more specific object of the present invention is to provide a technique of the foregoing type which determines the solution of a K-dimensional assignment problem where "K" is greater than or equal to three.

SUMMARY OF THE INVENTION

The invention relates to a method and apparatus for tracking objects. First a region containing the objects is scanned to generate a multiplicity of sequential images or data sets of the region. A plurality of points in each of the images or data sets corresponds to a respective plurality of the objects. Next, respective figures of merit are determined for assigning the points to the tracks. Next, a k-dimensional cost function is defined which sums the figures of merit for combinations of assignments from the images or data sets. Next, the complexity of the cost function is reduced by permitting a point to be assigned to more than one track and adding a penalty factor to the cost function when a point is assigned to more than one track. The reducing step are iteratively repeated and the resultant penalized cost function is solved. Next, an auxiliary function at $(k-1)$-dimension is defined as a function of lower order penalty factors and a solution at the dimension at which the penalized cost function was solved directly. Next, a gradient of the auxiliary function is determined, a step is made in the direction of the gradient to identify a peak region of the auxiliary function and penalty factors at the peak region are determined. The penalty factors at the peak region are used to determine track assignments for the points in the images or data sets. Then one or more of the following actions are taken based on the track assignments: sending a warning to aircraft or a ground or sea facility, controlling air traffic, controlling anti-aircraft or anti-missile equipment, taking evasive action, working on one of the objects.

According to one feature of the present invention the following steps are also performed before the step of defining the auxiliary function. Define a preliminary auxiliary function at a dimension equal or one greater than the dimension at which the penalized cost function is solved directly. The preliminary auxiliary function is a function of lower order penalty values and a solution at the dimension at which the penalized cost function was solved directly. Determine a gradient of the preliminary auxiliary function, step in the direction of the gradient to identify a peak region of the preliminary auxiliary function and determine penalty factors at the peak region. Iteratively repeat the defining, gradient determining, stepping and peak determining steps to define auxiliary functions at successively higher dimensions until the auxiliary function at the $(k-1)$ dimension is determined.

BRIEF DESCRIPTION OF THE FIGURES

FIG. 1 is a graph of images or data sets generated by a scan of a region and possible tracks within the images or data sets according to the prior art.

FIG. 2 illustrates cost and assignment matrices for the data sets of FIG. 1 according to the prior art.

DETAILED DESCRIPTION OF THE PREFERRED EMBODIMENTS

Figure 3:
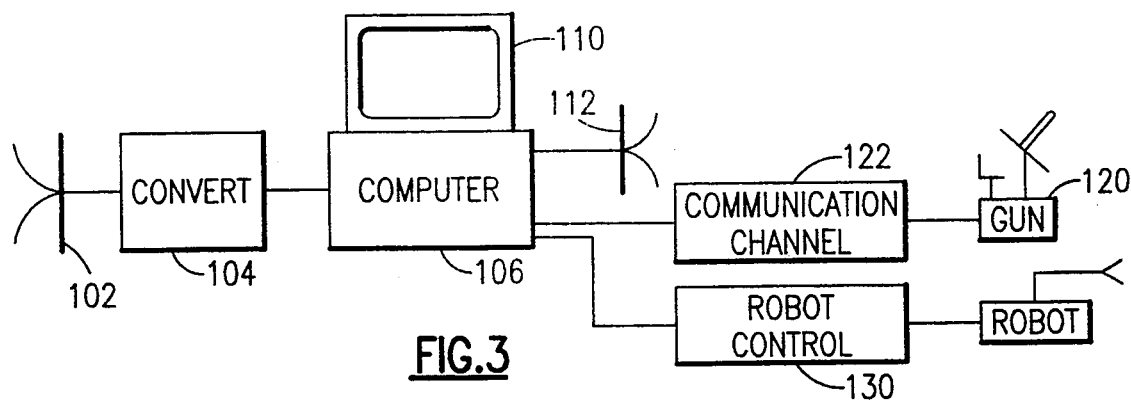
FIG. 3 is a block diagram of the present invention.

Referring now to the other figures in detail wherein like reference numerals indicate like elements throughout the several views, FIG. 3 illustrates a system generally designated 100 for implementing the present invention. System 100 comprises a radar station 102 for scanning an aerial or work region and generating signals indicating locations of objects within the region. The signals are input to a converter 104 which converts the signals to point form in which each object (or false positive) is represented by a single point. The output of the converter is input to and readable by a computer 106. As described in more detail below, the computer 106 assigns the points to respective tracks, and then displays the tracks and extrapolations of the tracks on a monitor 110. Also, the computer 106 determines an appropriate action to take based on the tracks. For example, in a commercial application at an airport, the computer can determine if two of the tracked aircraft are on a collision course and if so, signal a transmitter 112 to warn the aircraft, or if a scheduled take-off will pose the risk of collision, delay the take-off. For a military application on a ship or base, the computer can determine subsequent coordinates of enemy aircraft and send the coordinates to an anti-aircraft gun or missile 120 via a communication channel 122. In a robotic application, the computer controls the robot to work on the proper object or portion of the object.

The invention generates K-dimensional matrices where K is the number of images or sets of observation data in the look ahead window plus one. Then, the invention formulates a set of k-dimensional equations defining the problem. To eliminate the "<" type problem formulation that resulted from false positives, a rule is added which requires that a hypothesis be formed incorporating each observation with K−1 gap fillers. When the resulting solution includes this form of hypothesis it is an explicit statement that the involved observation is a false positive.

The resulting generalization of Equations without the "less than" complication is the following K-Dimensional Assignment Problems in which K≧3 or k∈{3, . . ., K}:

$$\text{Minimize: } \sum_{i_1=1}^{N_1} \ldots \sum_{i_k=1}^{N_k} c_{i_1\ldots i_k} z_{i_1\ldots i_k} \qquad [1.1a]$$

$$\text{Subject to: } \sum_{i_2=1}^{N_2} \ldots \sum_{i_k=1}^{N_k} z_{i_1\ldots i_k} = 1, \quad i_1 = 1, \ldots N_1 \qquad [1.1b]$$

$$\sum_{i_1=1}^{N_1} \ldots \sum_{i_{j-1}=1}^{N_{j-1}} \sum_{i_{j+1}=1}^{N_{j+1}} \ldots \sum_{i_k=1}^{N_k} z_{i_1\ldots i_k} = 1, \qquad [1.1c]$$

for $i_j = 1, \ldots N_j$ and $j = 2, \ldots k-1$ $$\sum_{i_1=1}^{N_1} \ldots \sum_{i_{k-1}=1}^{N_{k-1}} z_{i_1\ldots i_k} = 1, \quad i_k = 1, \ldots N_k \qquad [1.1d]$$

$$z_{i_1\ldots i_k} \in \{0,1\}, \quad i_n \, n = 1, \ldots, k \qquad [1.1e]$$

where c and z are similar shaped matrices representing costs and hypothetical assignments. These matrices are sparse.

After formulating the k-dimensional problem, the present invention solves the resulting problem so as to generate the outputs required by devices 110, 112, 122 and 130. The computer processes each set of observations $O_i$ received from converter 104 at time $t_i$ where $i = K, \ldots, \infty$ in a batch consisting of the observation sets $O_{i-K+1}, \ldots, O_i$ and the track history $T_{i-K}$. (Bold type designations refer to the set of elements for the indicated time, i.e. the set of all observations in the scan or tracks existing at the time, etc.) The result of this processing is the new set of tracks $T_{i-K+1}$ and a set of cost weighted possible solutions indicating how the tracks might extend to the current time. At time $t_{i+1}$ the batch process is repeated using the newest observation set and deleting the oldest. It is a moving window which is being shifted forward to always incorporate the most recent data. The effect is that input observations are reused for K−1 cycles and then on the data's K-th reuse they are integrated with the track history.

Figure 7:
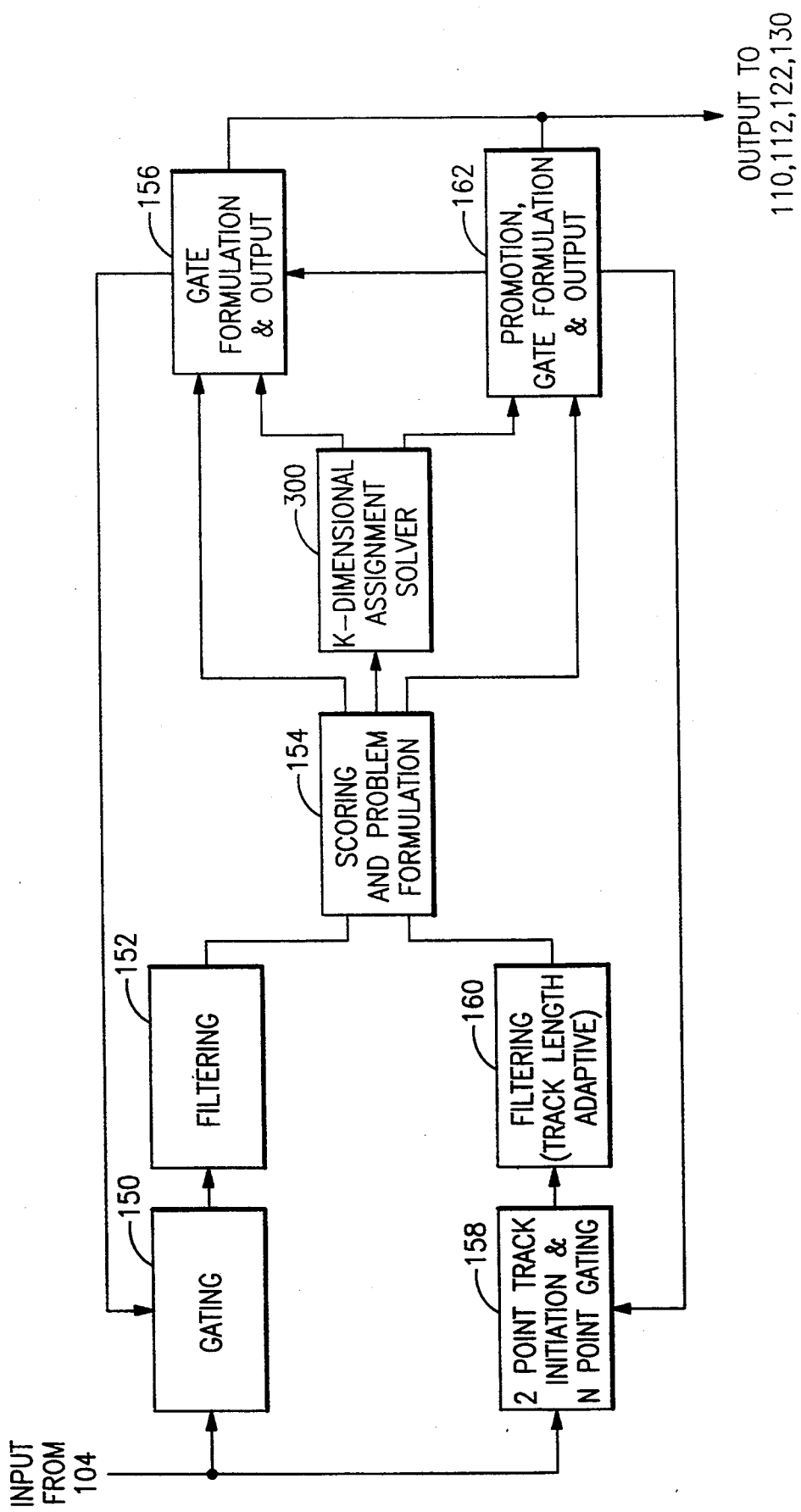
FIG. 7 is another block diagram of the present invention for solving the k-dimensional assignment problem where "k" is greater than or equal to 3.

FIG. 7 illustrates various processes implemented upon receipt of each set of observation data. Except for the addition of the K-dimensional assignment solving process 300 and the modification to scoring process 154 to build data structures suitable for process 300 all processes in FIG. 7 are based upon prior art. The following processes 150 and 152 extend previously defined tracks $h_{i-1}$, based on new observations. Gate formulation and output process 156 determines a zone in which the previously defined tracks can possibly extend based on limits of velocity, maneuverability and radar precision, and by way of example, can use the cone method described above. The definition of the zone is passed to gating process 150. When new observation data $O_i$ is received the gating process 150 will match each member observation with the gate region for each member of the hypothetical set $h_{i-1}$. After all input data is processed the new hypothesis set $h_i$ is generated by extending the prior set with missed detect fillers, and with all observation elements that satisfied the gate. This is a many to many matching in that each hypothesis member can be extended to many observations and each observation can be used to extend many hypothesis. It however is not a full matching in that any hypothesis will not be matched to all observations nor vice versa. It is this matching characteristic that leads to the sparse matrices involved in the tracking process. Gating forwards the new hypothesis set $h_i$ to filtering process 152. Filtering process 152 determines a smooth curve for each member of $h_i$. Such a smooth curve is more likely than a sharp turn from each point straight to the next point and removes small errors that could be attributed to generation of the image. The filtering preferably utilizes a minimization of least squares test of the points in the hypothesis or a Kalman Filtering approach.

As noted above, the foregoing track extension process requires knowledge of a previous track. For the initial observations, the following gating process 158 and filtering process 160 determine the "previous track" based on initial observations. The points from the first image form the beginning points of all possible tracks. After data from next image is received, sets of simple two point straight line tracks are defined. Then, promotion, gate formulation and output step 162 determines a zone in which future extensions are possible. Filtering step 160 uses curve fitting techniques to smooth the track extensions depending upon the number of prior observations that have accumulated in each hypothesis. Promotion, gate formulation and output process 162 also determines when sufficient observations have accumulated to form a basis for promoting the track to processes 150 and 152 as described above.

The output of each of the filtering processes 152 and 160 is a set of hypothetical track extensions. Each such extension contains the hypothetical initial conditions (from the previous track), the list of observations incorporated in the extension, and distance between each observation and the filtered track curve. Scoring process 154 determines the cost figure of merit based on the distance although the particular formula for determining the cost is not critical to the present invention. A preferred formula utilizes a negative log likelihood function in which the cost is the negative of the sum of the logs of the distances normalized by sensor standard deviation parameters, the log likelihoods for events related to track initiation, track termination, track maneuver, false negatives and false positives. Track maneuvers are detected by comparing the previous track curve with the current extension. Other events are detected by analyzing the relative relationship of gap fillers in the hypothesis. After determining that one of these events occurred, a cost for it can be determined based upon suitable statistics tables and system input parameters. The negative log likelihood function is desirable because it permits effective integration of the useful components. Copies of the hypothesis set which were scored are passed directly to the gate formulation and output steps 156 and 162. Scoring process 154 also arranges the actual scores in a sparse matrix based upon observation identifiers, and passes them to K-dimensional assignment problem solving process 300.

The assignment solving process 300 is described below. Its output is simply the list of assignments which are the most likely solution of the problem described by Equation 1.1. Gate formulation and output processes 156 and 162 use that list to generate the updated track history $T_i$ based on information in the selected hypotheses, to eliminate or prune alternative hypothesis that are prohibited by the actual assignment, and to output any required data. After those steps the process will generate and forward the new set of gates for each remaining hypothesis and the processes will then be prepared to receive the next set of observations. In actual implementations the preferred loop will generate gates for a delayed set of observations rather than the subsequent set. This permits gating steps to operate on even sets of observations while the scoring step 154 and K-Dimensional solving process operate on odd sets of observations, or vice versa. This implementation detail does not effect the overall concept of the invention.

The assignment solving process 300 permits the tracker to operate with window size of $K-1$ for $K \geq 3$. The upper limit of this range will depend only upon the computational power of the comparator 106 and the response time constraints of system 100. The $K-1$ observation sets within the processing window plus the prior track history result in a K-dimensional Assignment Problem as described by Equation 1.1. The present invention solves this generalized problem including the processes required to consider false positives and negatives, and also the processes required to consider sparse matrix problem formulations.

Figure 4:
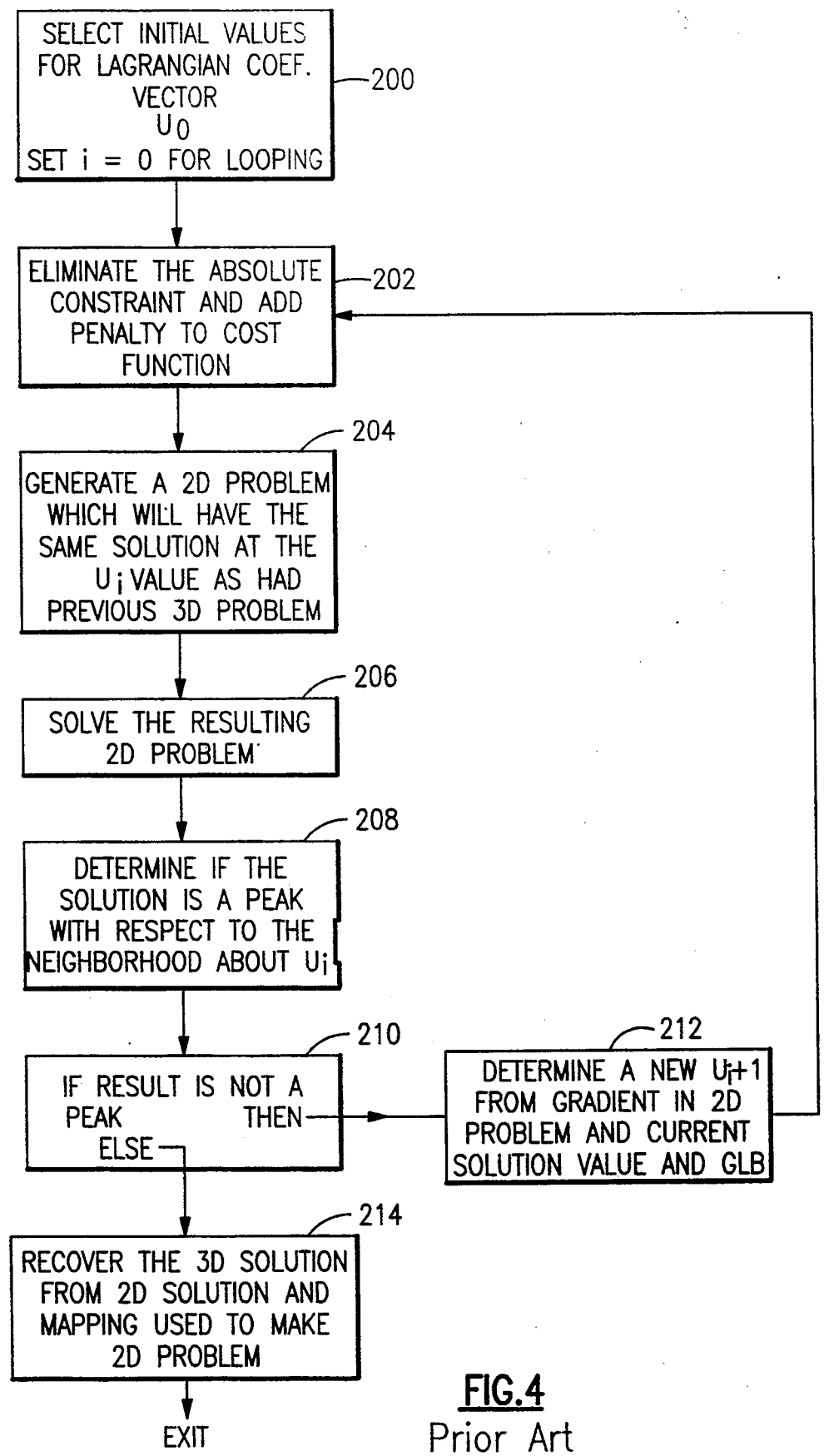
FIG. 4 is a flow chart of a process according to the prior art for solving a 3-dimensional assignment problem.

FIG. 4 illustrates use of the Frieze and Yadagar process according to the prior art to relax a 3-dimensional problem to the 2-dimensional problem and then hill climb to solve the 3-dimensional assignment problem. The present invention uses Lagrangian Relaxation to reduce the dimension of the original problem to three and then uses the process of FIG. 4 to solve the 3-dimensional problem. The Lagrangian Relaxation technique relaxes the rigid requirement that each point is assigned to one and only one track. Instead, an additional cost, which is equal to a respective Lagrangian Coefficient "u", is added to the cost function of equation 1.0(a) whenever a point is assigned to more than one track. This additional cost can be picked to weight the significance of each constraint violation differently, so this additional cost is represented as a vector of coefficients u which are correlated with respective observation points. Hill climbing will then develop a sequence of Lagrangian Coefficients set designated ($u_0, \ldots, u_j$, $u_{j+1}, \ldots, u_p$). That correspond to an optimum solution of the 2-dimensional assignment problem. The assignments at this optimum solution are then used to "recover" the assignment solution of the 3-dimensional assignment problem.

In step 200, initial values are selected for the $u_0$ coefficients. Because the Lagrangian Relaxation process is recursive, the initial values are not critical and are all initially selected as zero. In step 202, these additional costs are applied to equation 1.0(a). With the addition of the costs "u", the goal is still to assign the points which minimize the total cost. This transforms Equation 1.0(a), written for $k=3$ and altered to exclude mechanisms related to false positives and negatives, into Equation 2.1(a). In the first iteration it is not necessary to consider the "u" matrix because all "u" values are set to zero. To relax the requirement that each point be assigned to one and only one track, the constraint Equation 1.0(d) is also changed to permit points from the last image to be assigned to more than one track. While any axis can be chosen for relaxation, observation constraints are preferably relaxed. The effect of this relaxation is to create a new problem which must have the same solution in the first two axis but which can have a differing solution in the third axis. The result is equation 2.1(b-d).

$$\text{Minimize: } \sum_{i_1=1}^{N_1} \sum_{i_2=1}^{N_2} \{(c_{i_1\ldots i_3} - u_{ji_3})\} z_{i_1 i_2 i_3} \quad [2.1a]$$

$$\text{Subject to: } \sum_{i_2=1}^{N_2} \sum_{i_3=1}^{N_3} z_{i_1 i_2 i_3} = 1, \quad i_1 = 1, \ldots N_1 \quad [2.1b]$$

$$\sum_{i_1=1}^{N_1} \sum_{i_3=1}^{N_3} z_{i_1 i_2 i_3} \leq 1, \quad i_2 = 1, \ldots N_2 \quad [2.1c]$$

$$z_{i_1 i_2 i_3} \in \{0,1\} \quad z_{i_1 i_2 i_3} \quad [2.1d]$$

Step 204 then selects from the 3-dimensional problem described by Equation 2.1 a new 2-dimensional problem which will have the same solution for the first two indices. As Equation 2.1 has no constraints on the $3^{rd}$ axis, any value within a particular $3^{rd}$ axis can be used in a solution, but using anything other than the minimum value from any 3-rd axis has the effect of increasing solution cost. The effect of step 204 is to change the 3-dimensional arrays in Equation 2.1 into 2-dimensional arrays as shown in Equation 2.2 and to generate the new 2-dimensional matrix $m_{i_1 i_2}$ defined as shown in Equation 2.3.

$$\text{Minimize: } \sum_{i_1=1}^{N_1} \sum_{i_2=1}^{N_2} \left( \begin{array}{c} \text{Min:} \\ (c_{i_1\ldots i_3} - u_{ji_3}) \\ i_3 \end{array} \right) z_{i_1 i_2} \quad [2.2a]$$

$$\text{Subject to: } \sum_{i_2=1}^{N_2} \sum_{i_3=1}^{N_3} z_{i_1 i_2} = 1, \quad i_1 = 1, \ldots N_1 \quad [2.2b]$$

$$\sum_{i_1=1}^{N_1} \sum_{i_3=1}^{N_3} z_{i_1 i_2} \leq 1, \quad i_2 = 1, \ldots N_2 \quad [2.2c]$$

$$z_{i_1 i_2} \in \{0,1\} \quad z_{i_1 i_2} \quad [2.2d]$$

$$m_{i_1 i_2} = \text{Min: arg minimize } \{c_{i_1 i_2 i} - u_{ji} | i = 1, \ldots, N_k\} \quad [2.3]$$

The cost function for the reduced problem as defined by Equation 2.2(a), if evaluated at all possible values of u is a surface over the domain of $U^3$. This surface is referred to as $\Phi(u)$ and is non-smooth but provably convex (i.e. it has a single peak and several other critical characteristics which form terraces.) Because of the convex characteristics the results from solving Equation 2.2 at any particular $u_j$ can be used to generate a new set of coefficients $u_{u+1}$ whose corresponding Equation 2.2 problem solution is a cost value closer to the peak of $\Phi(u)$. The particular set of Lagrangian Coefficients that will generate the 2-dimensional problem resulting in the maximum cost is designated $u_p$. To recover the solution to the 3-dimensional assignment problem requires solving the Equation 2.2 problem corresponding to $u_p$.

In step 206, the two dimensional problem is solved directly using a known technique such as Reverse Auction for the corresponding cost and solution values. This is the evaluation of one point on the surface or for the first iteration $\Phi(u_0)$.

Thus, after this first iteration, the points have been assigned based on all "u" values being arbitrarily set to zero. Because, the "u" values have been arbitrarily assigned, it is unlikely that these assignments are correct and it is likely that further iterations are required to properly assign the points. Step 208 determines whether the points have been properly assigned after the first iteration by determining if for this set of assignments whether a different set of "u" values could result in a higher total cost. Thus, step 208 is implemented by determining the gradient of Equations 2.2 with respect to $u_j$. If the gradient is substantially non-zero (greater than a predetermined limit) then the assignments are not at or near enough to the peak of the $\Phi(u)$ surface (decision 210), and the new set of Lagrangian Coefficients $u_{j+1}$ are determined.

Hill climbing Step 212 determines the $u_{j+1}$ values based upon the $u_j$ values, the direction resulting from projecting the previous gradient into the $U^3$ domain, and a step size. The solution value of the 2-dimensional problem is the set of coefficients that minimize the 2-dimensional problem and the actual cost at the minimum. Those coefficients augmented by the coefficients stored in $m_{i1i2}$ permit the evaluation (but not the minimization) of the cost term in Equation 2.1. These two cost terms are lower and upper bounds on the actual minimized cost of the 3-dimensional problem, and the difference between then in combination with the gradient is used to compute the step size.

With this new set of "u" values, steps 202–210 are repeated as a second iteration. Steps 211 and 202–210 are repeated until the gradient as a function of u determined in step 208 is less than the predetermined limit. This indicates that the $u_p$ values which locate the peak area of the $\Phi(u)$ surface are determined and that the corresponding Equation 2.2 problem has been solved. Step 214 will attempt to use the assignments that resulted from this particular 2-dimensional assignment problem to recover the solution of the 3-dimensional assignment problem as described below. If the limit was chosen properly so that the "u" values are close enough to the peak, this recovery will yield the proper set of assignments that rigidly satisfies the constraint that each point be assigned to one and only one track. However, if the "u" values are not close enough to the peak, then the limit value for decision 210 is reduced and the repetition of steps 211 and 202–210 is continued.

Step 214 recovers the 3-dimensional assignment solution by using the assignment values determined on the last iteration through step 208. Consider the 2-dimensional z assignment matrix to have 1's in the locations specified by the list $L_1 = (a_i, b_i)_{i=1}^N$. If the 3-dimensional z matrix is specified by placing 1s at the location indicated by the list $L_2 = (a_i, b_i, m_{aibi})_{i=1}^N$ then the result is a solution of Equation 2.1. Let $L_3 = (m_{aibi})_{i=1}^N$ be the list formed by the third index. If each member of $L_3$ is unique then the $L_2$ solution satisfies the third constraint so it is a solution to Equation 1.1. When this is not the case, recovery determines the minimal substitutions required within list $L_3$ so that it plus $L_1$ will be a feasible solution. This stage of the recovery process is formulated as a 2-dimensional assignment problem: Form a new cost matrix $[c_{i,j}]_{ij=1}^N$ where $c_{i,j} = c_{ai,bi,j}$ for $j=1 \ldots N_i$ and the $N_i$ term is the total number of cost elements in the selected row of the 3-dimensional cost matrix. Attempt to solve this 2-dimensional problem for the minimum using =1 constraints. If a feasible solution is found then the result will have the same form as list $L_1$. Replace the first set of indexes by the indicated ($a_i$, $b_i$) pairs taken from list $L_1$ and the result will be a feasible solution of Equation 1.1. If no feasible solution to the new 2-dimensional problem exists then further effort to locate the peak of $\Phi(u)$ is required.

GENERALIZE K-DIMENSIONAL ASSIGNMENT SOLVING PROCESS

The result of the scoring step 154 is a K-dimensional Cost Matrix which is structured as a sparse matrix (i.e. only a small percentage of the slots in the cost and assignment matrices are filled). Individual cost elements represent the likelihood that track$_i$ as extended by the set of observations $\{o_{ij} | i=1, \ldots, K-1\}$, is not valid. Because, the matrix is sparse the list of cost elements is stored as a packed list, and then for each dimension of the matrix a vector of variable length list of pointers to the cost elements is generated and stored. This organization means that for a particular observation $o_{ij}$ the $j^{th}$ list in the $i^{th}$ vector will be a list of pointers to all hypothesis in which $o_{ij}$ participates. This structure is further explained in the following section dealing with problem partitioning.

The objective of the assignment solving process is to select from the set of all possible combinations a subset that satisfies two criteria. First, each point in the subset of combinations should be assigned to one and only one track and therefore, included in one and only one combinations of the subset, and second, the total of the scoring sums for the combinations of the subset should be minimized. This yields the following K-dimensional equations:

$$\text{Minimize: } v_k(z^k) = \sum_{i_1=0}^{N_1} \ldots \sum_{i_k=0}^{N_k} c_{i_1 \ldots i_k}^k z_{i_1 \ldots i_k}^k \quad [3.1]$$

$$\text{Subject to: } \sum_{i_2=0}^{N_2} \ldots \sum_{i_k=0}^{N_k} z_{i_1 \ldots i_k}^k = 1 \quad i_1 = 1, \ldots N_1$$

$$\sum_{i_1=0}^{N_1} \ldots \sum_{i_{j-1}=0}^{N_{j-1}} \sum_{i_{j+1}=0}^{N_{j+1}} \ldots \sum_{i_k=0}^{N_k} z_{i_1 \ldots i_k}^k = 1$$

for $i_j = 1, \ldots N_j$ and $j = 2, \ldots k-1$ $$\sum_{i_1=0}^{N_1} \ldots \sum_{i_{k-1}}^{N_{k-1}} z_{i_1 \ldots i_k}^k = 1 \quad i_k = 1, \ldots N_k$$

$$z_{i_1 \ldots i_k}^k \in \{0,1\} \quad \text{for all } i_1 \ldots i_k$$

where $c^k$ is the cost, i.e. some function of the distance between the observed point $z^k$ and the smoothed track determined by the filtering step, and $v_k$ is the cost function. This set of equations is similar to the set presented in Equation 1.1 except that it includes the subscript and superscript k notation. In solving the K-dimensional Assignment Problem the invention reduces the K-dimensional problems to $K-1$ and then to $K-2$ etc. dimensional problems. The symbol $k \in \{3, \ldots, K\}$ customizes Equation 3.1 to a particular relaxation level. The notation is used to reference data from levels relatively removed as in $c^{k+1}$ are the cost coefficients which existed prior to this level of relaxed coefficients $c^k$. Actual observations are numbered from 1 to $N_i$ where $N_i$ is the number of observations in scan i. The added 0 observation in each set of observations is the unconstrained 'gap filler'. This element serves as a filler in substituting for missed detects, and a sequence of these elements including only one true observation represents the possibility that the observation is a false positive. By being unconstrained it can be used in as many hypothesis as required.

While direct solution to this problem would give the precise assignment, the solution of k-dimensional equations directly for large k is too complex and time consuming for practice. The present invention solves this problem indirectly.

The following is a short description of many aspects of the present invention and includes some steps according to the prior art. The first step in solving the problem indirectly is to reduce the complexity of the problem by the previously known Lagrangian Relaxation technique. According to the Lagrangian Relaxation technique, the absolute requirement that each point is assigned to one and only one track is relaxed such that for some one image, points can be assigned to more than one track. However, a penalty based on a respective Lagrangian Coefficient $u^k$ is added to the cost function when a point in the image is assigned to more than one track. The Lagrangian Relaxation technique reduces the complexity or "dimension" of the penalized cost function problem because one constraint is relaxed. During the first iteration of relaxation, the proper $u^k$ penalty values are not known and all are arbitrarily set to zero. The Lagrangian Relaxation is performed iteratively to repeatedly reduce the dimension until a 2-dimensional penalized cost function problem results. This problem is solved directly by a previously known technique. The penalized cost function for the 2-dimensional problem defines a valley shaped surface which is a function of various sets of $\{u^k | k=3, \ldots, K\}$ penalty values and one set of assignments for the points in the two dimensions. That is, for each particular $u^3$ there is a corresponding 2-dimensional minimization problem and its solution. The solution of the 2-dimensional penalized cost function problem identifies the set of assignments for the particular $u^3$ values that minimize the penalized cost function. However, these assignments are not likely to be optimum for any higher dimensional problem because they were based on an initial arbitrary set of $u^k$ values. Therefore, the next step is to determine the optimum assignments for the 3-dimensional problem. There exists a 2-dimensional hill shaped function $\Phi$ which is a graph of the minimums of all penalized cost functions at various sets of assignments in 2-dimensions. For the 3-dimensional problem, the $\Phi$ function can be defined based on the solution to the foregoing 2-dimensional penalized cost function. By using the current $u^3$ values and the $\{u^k | k>3\}$ values originally assigned. Then, the gradient of the hill-shaped $\Phi$ function is determined, which gradient points toward the peak of the hill. By using the gradient and $u^3$ values previously selected for the one point on the hill (corresponding to the minimum of the penalized cost $\Phi$ function) as a starting point, the $u^3$ values can be found for which the corresponding problem will result in the peak of the $\Phi$ function. The solution of the corresponding 2-dimensional problem is the proper values for 2 of the 3 set of indices in the 3-dimensional problem. These solution indices can select as subsection of the cost array which maps to a 2-dimensional array. The set of indices which minimize the 2-dimensional assignment problem based on that array corresponds to the proper assignment of points in the third dimension. The foregoing "recovery" process was known in the prior art, but it is modified here to adjust for the sparse matrix characteristic.

The next task is to recover the solution of the proper $u^4$ values for the 4-dimensional problem. The foregoing hill climbing process will not work again because the foregoing hill climbing process when required to locate the 4-dimensional $u^4$ values for the peak of $\Phi^3$ requires the exact definition of the $\Phi^3$ function (as was available in the case of $\Phi^2$) or an always less than approximation of $\Phi^3$, whereas the iteration can result in a greater than approximation of $\Phi^3$. According to the present invention, another 3-dimensional function $\Psi$ is defined which is a less than approximation the 3-dimensional $\Phi$ function and which can be defined based on the solution to the 2-dimensional penalized cost function and the previously assigned and determined $u^k$ values. Next, the gradient of the $\Psi$ function is found and hill climbing used to determine the $u^4$ values at the peak. Each selected $u^4$ set results in a new 3-dimensional problem and requires the 2-dimensional hill climbing based upon new 2-dimensional problems. At the peak of the 3-dimensional $\Psi$ function, the solution values are a subset of the values required for the 4-dimensional solution. Recovery processing extends the subset to a complete solution. This process is repeated iteratively until the $u^k$ values that result in a corresponding solution at the peak of the highest order $\Psi$ and $\Phi$ functions are found. The final recovery process then results in the solution K-dimensional problem.

Figure 5:
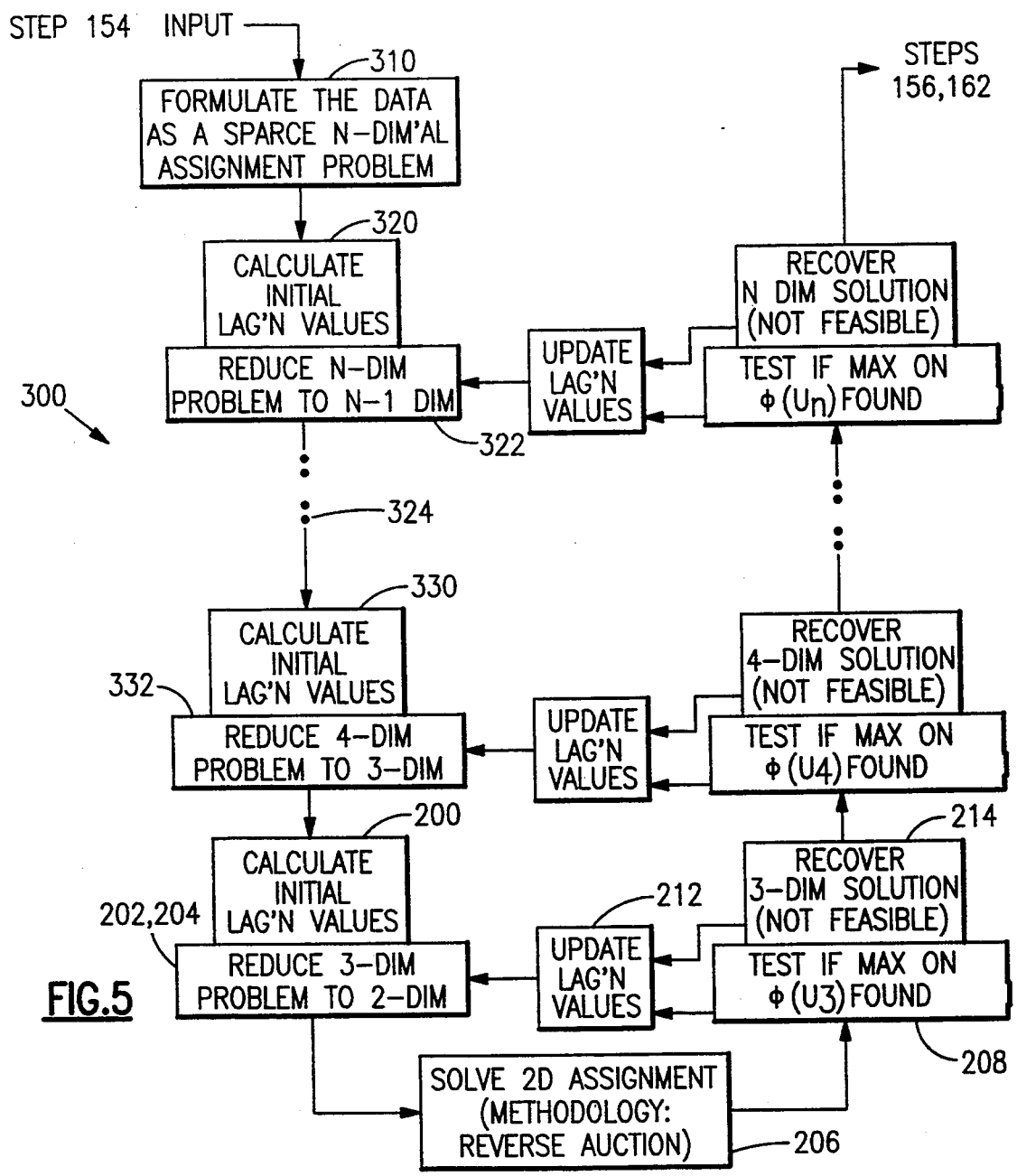
FIG. 5 is a flow chart of a process according to the present invention for solving a k-dimensional assignment problem where "k" is greater than or equal to 3.

FIG. 5 illustrates process 300 in more detail.

PROBLEM FORMULATION

In problem formulation step 310, all data structures for the subsequent steps are allocated and linked by pointers as required for execution efficiency. The incoming problem is partitioned as described in the subsequent section. This partitioning has the effect of dividing the incoming problem into a set of independent problems and thus reducing the total workload. The partitioning process depends only on the actual cost matrix so the partitioning can and is performed for all levels of the relaxation process.

RELAXATION AND RECOVERY

Step 320 begins the Lagrangian Relaxation process for reducing the K-dimensional problem by selecting all Lagrangian Coefficient $u^k$ penalty values initially equal to zero. The Lagrangian Coefficients associated with the $K^{th}$ constraint set are a $N_K+1$ element vector. The reduction of this K-dimensional problem in step 322 to a K−1 dimensional problem uses the two step process described above. First, a penalty based on the value of the respective $u^K$ coefficient is added to the cost function when a point is assigned to more than one track and then the resultant cost function is minimized. However, during the first iteration, the penalty is zero because all $u^K$ values are initially set to zero. Second, the requirement that no point from any image can be assigned to more than one track is relaxed for one of the images. In the extreme this would allow a point from the relaxed image to associate with every track. However, the effect of the previous penalty would probably mean that such an association would not minimize the cost. The effect of the two steps in combination is to remove a hard constraint while adding the penalty to the cost function so that it operates like a soft constraint. For step 322 this two step process results in the following equations with k=K:

$$\Phi_k(u^k) \equiv \text{Minimize: } \phi_k(u^k,z^k) = \sum_{i_1=0}^{N_1} \cdots \sum_{i_k=0}^{N_k} c_{i_1\ldots i_k}^k z_{i_1\ldots i_k}^k - \sum_{i_k=0}^{N_k} u_{i_k}^k \left[ \sum_{i_1=0}^{N_1} \cdots \sum_{i_{k-1}}^{N_{k-1}} z_{i_1\ldots i_k}^k - 1 \right] \quad [3.2]$$

$$= \sum_{i_1=0}^{N_1} \cdots \sum_{i_k=0}^{N_k} (c_{i_1\ldots i_k}^k - u_{i_k}^k) z_{i_1\ldots i_k}^k + \sum_{i_k=0}^{N_k} u_{i_k}^k$$

Subject to: $\sum_{i_2=0}^{N_2} \cdots \sum_{i_k=0}^{N_k} z_{i_1\ldots i_k}^k = 1 \quad i_1 = 1, \ldots N_1$ $\sum_{i_1=0}^{N_1} \cdots \sum_{i_{j-1}=0}^{N_{j-1}} \sum_{i_{j+1}=0}^{N_{j+1}} \cdots \sum_{i_k=0}^{N_k} z_{i_1\ldots i_k}^k = 1$ for $i_j = 1, \ldots N_j$ and $j = 2, \ldots k-1$ $z_{i_1\ldots i_k}^k \in \{0,1\}$ for all $i_1 \ldots l_k$ Because the constraint on single assignment of elements from the last image has been eliminated, a K−1 dimensional problem can be developed by eliminating some of the possible assignments. As described in Equation 3.3, this is done by selecting the smallest cost element from each of the $K^{th}$ axis vectors of the cost matrix. Reduction in this manner yields a new, lower order penalized cost function defined by Equation 3.3 which has the same minimum cost as does the function defined by equation 3.2.

The cost factors are selected as follows. Define an index array $m_{i_1 \ldots i_{k-1}}^k$ and new cost array $c_{i_1 \ldots i_{k-1}}^{k-1}$ by:

$m_{i_1\ldots i_k}^k = \text{Min: arg minimize } \{c_{i_1\ldots i_k}^k - u_{i_k}^k | i_k = 0, 1, \ldots, N_k\}$ [3.3]

$c_{i_1\ldots i_{k-1}}^{k-1} = c_{i_1\ldots i_{k-1} 1 m_{i_1\ldots i_k}^k}^k$ for $(i_1, \ldots, i_{k-1}) \neq (0, \ldots, 0)$ $c_{0,\ldots,0}^{k-1} = \sum_{i_k=0}^{N_k} \min \{0, c_{0\ldots 0}^k - u_{i_k}^k\}$ The resulting K−1 dimensional problem is:

$\Phi_k(u^k) =$ [3.4]

Minimize: $v_{k-1}(z^{k-1}) = \sum_{i_1=0}^{N_1} \cdots \sum_{i_{k-1}=0}^{N_{k-1}} c_{i_1\ldots i_{k-1}}^{k-1} z_{i_1\ldots i_{k-1}}^{k-1}$ Subject to: $\sum_{i_2=0}^{N_2} \cdots \sum_{i_k=0}^{N_k} z_{i_1\ldots i_k}^{k-1} = 1 \quad i_1 = 1, \ldots N_1$ $\sum_{i_1=0}^{N_1} \cdots \sum_{i_{j-1}=0}^{N_{j-1}} \sum_{i_{j+1}=0}^{N_{j+1}} \cdots \sum_{i_k=0}^{N_k} z_{i_1\ldots i_k}^{k-1} = 1$ for $i_j = 1, \ldots N_j$
and $j = 2, \ldots k-1$ $\sum_{i_1=0}^{N_1} \cdots \sum_{i_{k-2}=0}^{N_{k-2}} z_{i_1\ldots i_{k-1}}^{k-1} = 1 \quad i_{k-1} = 1, \ldots N_{k-1}$ $z_{i_1\ldots i_k}^k \in \{0,1\}$ for all $i_1 \ldots l_{k-1}$ Equation 3.1 and Equation 3.4 differ only in the dimension K vs. K−1, respectively. An optimal solution to equation 3.4 is also an optimal solution to equation 3.2. This relationship is the basis for an iterative sequence of reductions indicated by steps 320-332 through 330-332 and 200-204 in which the penalized cost function problem is reduced to a two dimensional problem. As these formula will be used to describe the processing at all levels, the lowercase k is used except where specific reference to the top level is needed. In step 206, the 2-dimensional penalized cost function is solved directly by the prior art Reverse Auction technique. Each execution of 206 produces two results, the set of $z^2$ values that minimize the problem and the cost that results $v_2$ when these z values are substituted into Equation 3.4a.

In step 208, according to the prior art, solution $z^2$ values are substituted into the 2-dimensional derivative of the $\Phi_2$ surface. The result indicates how the value of $u^3$ should be adjusted so as to perform the hill climbing function. As was previously described the objective is to produce a sequence of $u_i^3$ values which ends when the $u_p^3$ value in the domain of the peak of the $\Phi$ surface. The section "Determining Effective Gradient" describes how new values are computed and how it is determined that the current $u_i^k$ points to the peak of $\Phi_2$. When no further adjustment is required the flow moves to step 214 which will attempt to recover the 3-dimensional solution as previously described. When further adjustment is required then the flow progresses to step 212 and the new values of $u^k$ are computed. At the 2-dimensional level the method of the prior art could be used for the hill climbing procedure. However, it is not practical to use this prior art hill climbing technique to determine the updated Lagrangian Coefficients $u^k$ or the Max on the next (or any) higher order $\Phi$ surface because the the next (or any) higher dimensional $\Phi$ function cannot be defined based on known information.

Figure 6:
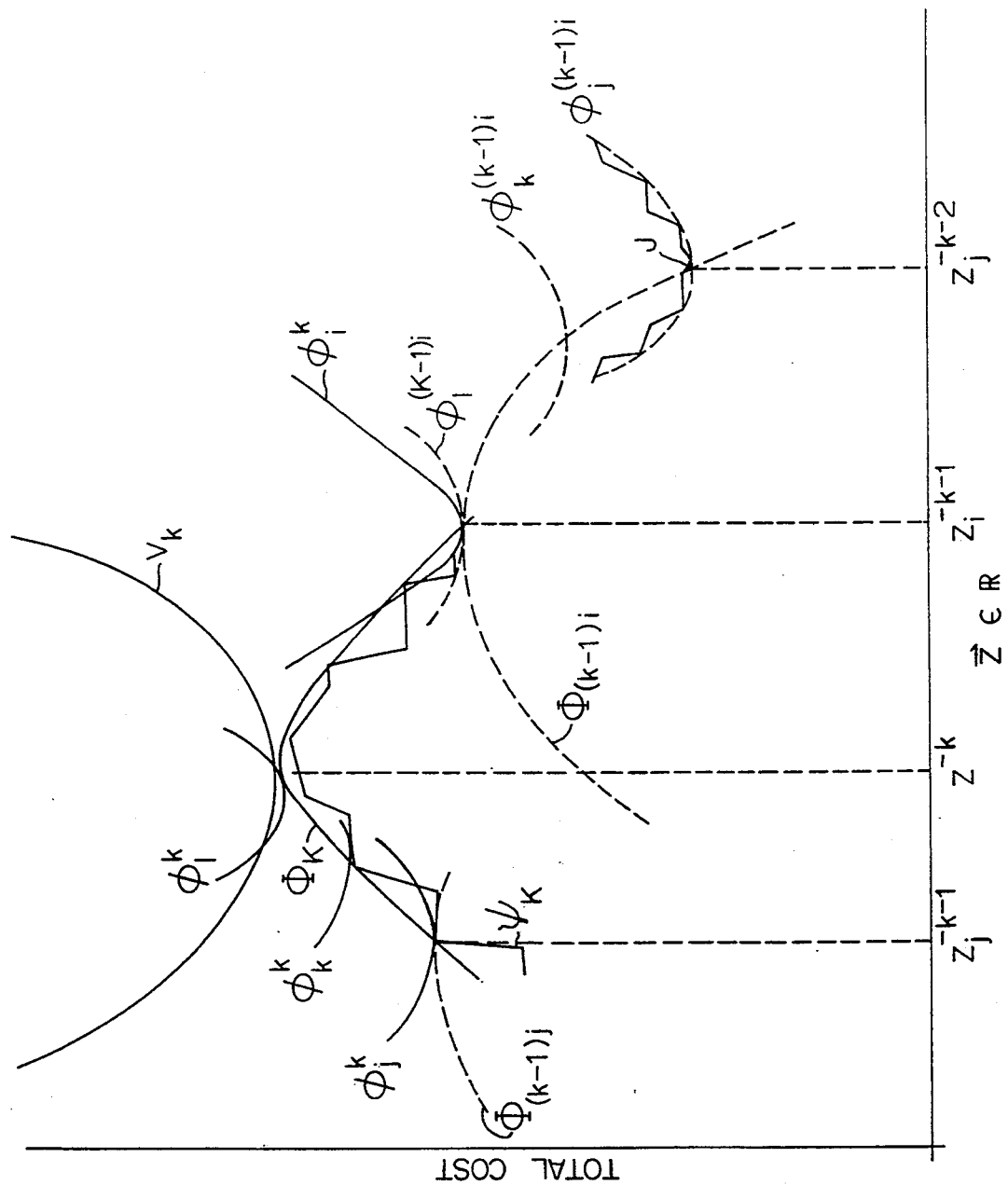
FIG. 6 is a graph of various functions used to explain the present invention.

Instead, the present invention defines a new function based on known information which is useful for hill climbing from the third to the fourth and above dimensions, i.e. $u^k$ values which result in z values that are closer to the proper z values for the highest k-dimension. This hill climbing process (which is different than that used in the prior art of FIG. 4 for recovering only the three dimensional solution) is used iteratively at all levels of the k-dimensional problem (including the 3-dimensional level where it replaces prior art) even when k is much larger than three. FIG. 6 helps to explain this new hill climbing technique and illustrates the original k-dimensional cost function $v_k$ of Equation 3.1. However, the actual k-dimensional cost surface $v_k$ defined by Equation 3.1 comprises scalar values at each point described by k-dimensional vectors and as such can not be drawn. Nevertheless, for illustration purposes only, FIG. 6 ignores the reality of ordering vectors and illustrates a concave function $v_k(z^k)$ to represent Equation 3.1. The $v_k$ surface is illustrated as being smooth to simplify the explanation although actually it can be imagined to be terraced. The goal of the assignment problem is to find the values of $\bar{z}^k$; these values minimize the k-dimensional cost function $v_k$.

For purposes of explanation, assume that in FIG. 6, k=4 (the procedure is used for all k≧3). This problem is reduced by two iterations of Lagrangian Relaxation to a 2-dimensional penalized cost function $\phi_j^{(k-1)i}$. This cost function, and all other cost functions described below are also non-smooth and continuous but are illustrated in FIG. 6 as smooth for explanation purposes. Solving the $\phi_j^{(k-1)i}$, problem results in one set of $z^2$ assignments and the value of $\Phi_{(k-1)i}$ at the point $u_y^2$. A series of functions $\phi_j^{(k-1)i}$, ..., $\phi_1^{(k-1)i}$ each a generated from a different $u^3$ are shown. The particular series illustrates the process of locating the peak of $\Phi_{(k-1)i}$. The 2-dimensional penalized cost functions $\phi_j^{(k-1)i}$, ..., $\phi_1^{(k-1)i}$ can be solved directly. Each such solution provides the information required to calculate the next $u^3$ value. Each iteration of the hill climbing improves the selection of $u^3$ values, i.e. yields $\phi^2$ problem whose solution is closer to those at the solution of the $\phi^3$ problem. The result of solving $\phi_1^{(k-1)i}$ is values that are on both $\Phi_{(k-1)i}$ and $\Phi_k$. FIG. 6 illustrates the $\Phi_k$ surface which comprises the minimums of all k-dimensional penalized cost function $\phi_k$ surfaces, i.e. if the minimization equations 3.2 and 3.4 were solved at all possible values of $u^k$ the function $\Phi_k(u^k)$ would result. The $\Phi_k$ surface is always less than the $v_k$ surface except at the peak as described in Equation 3.5 and its maximum occurs where the $v_k$ surface is minimum. Because the $\Phi_k$ surface represents the minimums of the $\phi_k$ surface, any point on the $\Phi_k$ surface can mapped to the $v_k$ surface. The $\Phi_k$ function provides a lower bound on the minimization problem described by Equation 3.1. Let $\bar{z}^k$ be the unknown solution to Equation 3.1 and note that:

$$\Phi^k(\mu^k) \leq v_k(\bar{z}^k) \leq v_{k-1}(z^k) \qquad [3.5]$$

Consequently, the $z^k$ values at the peak of $\Phi_k$ (i.e. the greatest lower bound on the cost of the relaxed problem), can be substituted into the k-dimensional penalized cost function to determine the proper assignments. Consequently, the present invention attempts to find the maximum on the $\Phi_k$ surface. However, it is not possible to use the prior art hill climbing to hill climb to the peak of $\Phi_k$ because the definition of $\Phi_k$ requires exact knowledge of lower order $\Phi$ functions. As the solution of $\phi_1^k$ is not exact the solution, in that higher order u values are not yet optimized, its value can be larger than the true peak of $\Phi_k$. As such it is not a lower bound on $v_k$ and it can not be used to recover the required solution.

Instead, the present invention defines an auxiliary function $\Psi_k$ which is based only on the solution to the 2-dimensional penalized cost function problem, lower order $z^k$ values and $u^k$ values determined previously by the reduction process. The $\Psi_k$ function is a less than approximation of $\Phi_k$, and its gradient is used for hill climbing to its peak. The $z^k$ values at the peak of the $\Psi_k$ function are then substituted into Equation 3.2 to determine the proper assignments. To define the $\Psi_k$ function, the present invention explicitly makes the function $\Phi_k(u^k)$ a function of all higher order sets of Lagrangian Coefficients with the expanded notation: $\Phi_k(u^k; u_{k+1}, ..., u^K)$. Then, a new set of $\Psi$ functions, is defined recursively, using the $\Phi_k$'s domain.

$$\Psi_3(u^3) = v_2 + \sum_{i_3=0}^{N_3} u_{i_3}^3 = \Phi_3(u^3; u^4, ..., u^K) \qquad [3.8a]$$

where $v_2$ is the solution value for the most recent 2-dimensional penalized cost function problem. For k>3

$$\Psi_k(u^3, ..., u^{k-1}; u^k) = \qquad [3.8b]$$

$$\begin{cases} \Phi_k(u^k; u^{k+1}, ..., u^K) & \text{If known} \\ \Psi_{k-1}(u^3, ..., u^{k-2}; u^{k-1}) + \sum_{i_k=0}^{N_k} u_{ik}^k & \text{otherwise} \end{cases}$$

From the definition of $\Phi_k$ and $v_k$ (Equation 3.4 compared with Equation 3.2):

$$\Phi_k(u^k; u^{k+1}, ..., u^K) = v_{k-1}(z^{k-1}) + \sum_{i_k=0}^{N_k} u_{ik}^k$$

it follows that:

$$\Psi_3(u^3) = v_2 + \sum_{i_3=0}^{N_3} u_{i_3}^3 = \Phi_3(u^3; u^4, ..., u^K) \leq v_3^3(z^3)$$

and with that Equation 3.5 is extended to:

$$\Psi_k(u^3, ..., u^{k-1}; u^k) \leq \Phi_k(u^k; u^{k+1}, ..., u^K) \leq v_k(\bar{u}^k) \leq v_k(u^k) \qquad [3.9]$$

This relationship means that either $\Phi_k$ or $\Psi_k$ may be used in hill climbing to update the Lagrangian Coefficients u. $\Phi_k$ is the preferred choice, however it is only available when the solution to Equation 3.2 is a feature solution to Equation 3.1 (as in hill climbing from the second to third dimension which is why prior art worked.) For simplicity in implementation, the function $\Psi_k$ is defined so that it equals $\Phi_k$ when either function could be used. It is therefore always used, even for hill climbing from the second dimension. The use of the $\Psi$ function which is based on previously assigned or determined u values and not higher order u values which are no yet determined, is an important feature of the present invention.

DETERMINING EFFECTIVE GRADIENT

After the $\Psi_k$ function is defined, the next steps of hill climbing/peak detection are to determine the gradient of the $\Psi_k$ function, determine an increasing portion of the gradient and then move up the $\Psi_k$ surface in the direction of this increasing portion of the gradient. As shown in FIG. 6, any upward step on the $\Psi_k$ surface, for example to the minimum of the $\phi_{kj}$ will yield a new set of $u^k$ values (to the "left") that is closer to the ideal set of $u^k$ values which correspond to the minimum of the $v_k$ function. While it is possible to iteratively step up this $\Psi_k$ surface with steps of fixed size and then determine if the peak has been reached, the present invention optimizes this process by determining the single step size from the starting point at the minimum of $\phi_{kj}$ that will jump to the peak and then calculating the $u^k$ values at the peak. Once the f."u" s u at the peak at $\Psi_k$ are determined, then the $u^k$ values can be substituted into Equation 3.2 to determine the proper assignment. (However, in a more realistic example, where k is much greater than three, then the $u^k$ values at the peak of the $\Psi$ function along with the lower order $u^k$ values and those assigned and yielded by the reduction steps are used to define the next higher level $\Psi$ function. This definition of a higher order $\Psi$ function and hill climbing process are repeated iteratively until $\Psi_k$, and the peak of $\Psi_k$ and the $u^k$ values at the peak of $\Psi_k$ are identified.) The following is a description of how to determine the gradient of each $\Psi$ surface and how to determine the single step size to jump to the peak from the starting point on each $\Psi$ surface.

As noted above, each $\Psi$ surface is nonsmooth. Therefore, if a gradient were taken at a single point, the gradient may not point toward the peak. Therefore, several gradients (a "bundle") are determined at several points on the $\Psi_k$ surface in the region of the starting point (i.e. minimum of $\phi k_i$) and then averaged. Statistically, the averaged result should point toward the peak of the $\Psi_k$ surface. Wolfe's Conjugate Subgradient Algorithm (Wolfe75, Wolfe79) for minimization was previously known in another environment to determine a gradient of a non-smooth surface using multiple subgradients and can be used with modification in the present invention. Wolfe's algorithm is further described in "A Method of Conjugate Subgradients for Minimizing Nondifferentiable Functions" page 147-173 published by Mathematical Programming Study 3 in 1975 and "Finding the Nearest Point in a Polytope" page 128-149 published by Mathematical Programming Study 11 in 1976. The modification to Wolfe's algorithm uses the information generated for $\Psi_k(u^{k3}, \ldots, u^{kk-2}; u^{kk-1})$ as the basis for calculating the subgradients. The definition of a subgradient $v$ of $\Psi_k(u^{k3}, \ldots, u^{kk})$ is any member of the subdifferential set defined as:

$$\delta\Psi_k(u) = \{v \in R^{Nk+1} | (\Psi_k(u^{k3}, \ldots, u^{kk-1}; u') - \Psi_k(u^{k3}, \ldots, u^{k-1}; u^k)) \geq v^T(u' - u^k) \, \forall \, u' \in R^{Nk+1}\}$$

Next, a subgradient vector is determined from this function. If $z^k$ is the solution of Equation 3.2, then differentiating $\Psi_k(u^3, \ldots, u^{k-1}; u^k)$ with respect to $u_{ik}{}^k$ and evaluating the result with respect to the current selection matrix $z^k$ yields a subgradient vector:

$$g = \left(0, \left(1 - \sum_{i_1=0}^{N_1} \cdots \sum_{i_{k-1}=0}^{N_k} z^k_{i_1,\ldots i_k} | i_k = 1, \ldots, N_k\right)\right)$$

The iterative nature of the solution process at each dimension yields a set of such subgradients. Except for a situation described below where the resultant averaged gradient does not point toward the peak, the most recent S such subgradients are saved and used as the 'bundle' for the peak finding process for this dimension. For example, at the k level there is a bundle of subgradients of the $\Psi_k$ surface near the minimum of the $\phi_{ki}$ surface determined as a result of solving Equation 3.1 at all lower levels. This bundle can be averaged to approximate the gradient. Alternately, the previous bundle can be discarded so as to use the new value to initiate a new bundle. This choice provides a way to adjust the process to differing classes of problems, i.e. when data is being derived from two sensors and the relaxation proceeds from data derived from one sensor to the other then the prior relaxation data for the first sensor could be detrimental to performance on the second sensors data.

STEP SIZE AND TERMINATION CRITERION

After the average gradient of the $\Psi_k$ surface is determined, the next step is to determine a single step that will jump to the peak of the $\Psi_k$ surface. The basic strategy is to first specify an arbitrary step size, and then calculate the value of $\Psi_k$ at this step size in the direction of the gradient. If the $\Psi_k$ value is larger than the previous one, this probably means that the step has not yet reached the peak. Consequently, the step size is doubled and a new $\Psi_k$ value determined and compared to the previous one. This process is repeated until the new $\Psi_k$ value is less than the previous one. At that time, the step has gone too far and crossed over the peak. Consequently, the last doubling is rolled-back and that step size is used for the iteration. If the initial estimated $\Psi_k$ is less than previous value then the step size is decreased by 50%. If this still results in a smaller $\Psi_k$ value then the last step is rolled back and the previous step size is decreased by 25%. The following is a more detailed description of this process.

With a suitable bundle of subgradients determined as just described. Wolfe's algorithm can be used to determine the effective subgradient (d) and the Upgraded value $u_{j+1}{}^k$. From the previous iteration, or from an initial condition, there exists a step length value (t). The value, $$u_+ = u_j{}^k + td$$

is calculated as an estimate of $u_{j+1}{}^k$. To determine if the current step size is valid the we evaluate $\Psi_k(u^3, \ldots, u^{k-2}; u_+)$. If the result represents an improvement then we double the step size. Otherwise we halve the step size. In either case a new $u_+$ is calculated. The doubling or halving continues until the step becomes too large to improve the result, or until it becomes small enough to not degrade the result. The resulting suitable step size is saved with d as part of the subgradient bundle. The last acceptable $u_+$ is assigned to $u_{j+1}{}^k$.

Three distinct criterion are used to determine when $u_j{}^k$ is close enough to $\bar{u}^k$:
1. The Wolfe's algorithm criterion of d=0 given that the test has been repeated with the bundle containing only the most recent subgradient.
2. The difference between the lower bound $\Phi_k(u^k)$ and the upper bound $v_k(z^k, u^k)$ being less than a preset relative threshold. (Six percent was found to be an effective threshold for radar tracking problems.)
3. An iteration count being exceeded.

The use of limits on the iteration are particularly effective for iterations at the level 3 through n−1 levels, as these iterations will be repeated so as to resolve higher order coefficient sets. With limited iterations the process is in general robust enough to improve the estimate of upper order Lagrangian Coefficients. By limiting the iteration counts then the total processing time for the algorithm becomes deterministic. That characteristic means the process can be effective for real time problems such as radar, where the results of the last scan of the environment must be processed prior to the next scan being received.

SOLUTION RECOVERY

The following process determines if the $u^k$ values at what is believed to be the peak of the $\Psi_k$ function adequately approximate the $u^k$ values at the peak of the corresponding $\Phi_k$ function. This is done by determining if the corresponding penalized cost function is minimized. Thus, the $u^k$ values at the peak of the $\Psi_k$ function are first substituted into Equation 3.2 to determine a set of z assignments for $k-1$ points. During the foregoing reduction process, Equation 3.4 yielded a tentative list of k selected z points that can be described by their indices as: $\{(i_1{}^j \ldots i_{k-1}{}^j)\}_{j=1}^{N_0}$, where $N_0$ is the number of cost elements selected into the solution. One possible solution of Equation 3.1 is the solution of Equation 3.2 which is described as $\{(i_1{}^j \ldots i_{k-1}{}^j m_{i1} \ldots i_{k-1})^k$ as it was defined in Equation 3.3. If this solution satisfies the k-th constraint set then it is the optimal solution.

However, if the solution for Equation 3.2 is not feasible (decision 355), then the following adjustment process determines if a solution exists which satisfies the k-th constraint while retaining the assignments made in solving Equation 3.4. To do this, a 2-dimensional cost matrix is defined based upon all observations from the k-th set which could be used to extend the relaxed solution.

$$h_{jl} = c^k_{i_1,\ldots,i_{k-1},l} \quad \begin{array}{l} \text{for } l = 0, \ldots, N_k \\ \text{and } j = 0, \ldots, N_0 \end{array} \quad [3.6]$$

If the resulting 2-dimensional assignment problem, $$\text{Minimize: } \sum_{j=0}^{N_0} \sum_{l=0}^{N_l} h_{jl} w_{jl} \quad [3.7]$$

$$\text{Subj. To: } \sum_{l=0}^{N_k} w_{jl} = 1 \; j = 1, \ldots, N_0$$

$$\sum_{l=0}^{N_k} w_{jl} = 1 \; j = 1, \ldots, N_0$$

$$w_{jl} \in \{0,1\} \; j = 0, \ldots, N_0, \; l = 0, \ldots, N_k$$

has a feasible solution then the indices of that solution map to the solution of Equation 3.1 for the k-dimensional problem. The first index in each resultant solution entry is the pointer back to an element of the $\{(i_1{}^j \ldots i_{k-1}{}^j m_{i1} \ldots i_{k-1})\}_{j=1}^{N_0}$ list. That element supplies the first $k-1$ indices of the solution. The second index of the solution to the recovery problem is the $k^{th}$ index of the solution. Together these indexes specify the values of $z^k$ that solve Equation 3.1 at the $k^{th}$ level.

If Equation 3.7 does not have a feasible solution then the value of $u_i{}^k$ which was through to represent $u_p{}^k$ is not representative of the actual peak and further iteration at the $k^{th}$ level is required. This decision represent the branch path from step 214 and equivalent steps.

PARTITIONING

A partitioning process is used to divide the cost matrix that results from the Scoring step 154 into as many independent problems as possible prior to beginning the relaxation solution. The partitioning process is included with the Problem Formulation Step 310. The result of partitioning is a set of problems to be solved i.e. there will be $p_1$ problems that consist of a single hypothesis, $p_2$ problems that consist of two hypothesis, etc. Each such problem is a group in that one or more observations or tracks are shared between members of the group.

In partitioning to groups no consideration is given to the actual cost values. The analysis depends strictly on the basis of two or more cost elements sharing the same specific axis of the cost matrix. In a 2-dimensional case two cost elements must be in the same group if they share a row or a column. If the two elements are in the same row, then each other cost element that is also in the same row, as well as any cost elements that are in columns occupied by members of the row must be included in the group. The process continues recursively. In literature it is referred to as 'Constructing a Spanning Forest.' The k-dimensional case is analogous to the 2-dimensional case. The specific method we have incorporated is a depth first search, presented by Aho, Hopecraft, and Ullman, in "Design and Analysis of Computer Algorithms", section 5.2, published by Addison-Westley, Mass.

The result of partitioning at level K is the set of problems described as $\{P_{ij} | i=1, \ldots, p_u \text{ and } j=1, \ldots, N\}$, where N is the total number of hypothesis. The problems labeled $\{P_{i1} | i=1, \ldots, p_1\}$ are the cases where their is only one choice for the next observation at each scan and that observation could be used for no other track, i.e. it is a single isolated track. The hypothesis must be in included in the solution set and no further processing is required.

As hypothesis are constructed the first element is used to refer to the track id. Any problem in the partitioned set which does not have shared costs in the first scan represent a case where a track could be extended in several ways but none of the ways share an observation with any other track. The required solution hypothesis for this case is the particular hypothesis with the maximum likelihood. For this case all likelihoods are determined as was described in Scoring and the maximum is selected.

In addition to partitioning at the K level, positioning is applied to each subsequent level $K-1, \ldots, 2$. For each problem that was not eliminated by either by the prior selection partitioning is repeated, ignoring observations that are shared in the last set of observations. Partitioning recognizes that relaxation will eliminate the last constraint set and thus partitioning is feasible for the lower level problems that will result from relaxation. This process is repeated for all levels down to $k=3$. The full set of partitionings can be performed in the Problem Formulation Step 310, prior to initiating the actual relaxation steps. The actual 2-dimensional solver used in step 206 includes an equivalent process so no advantage would be gained by partitioning at the $k=2$ level.

There are two possible solution methods for the remaining problems. "Branch and Bound" as was previously described, or the relaxation method that this invention describes. If any of the partitions have 5–10 possible tracks and less than 50 to 20 hypotheses, then the prior art "Branch and Bound" algorithm generally executes faster than does the relaxation due to its reduced level of startup overhead. The "Branch and Bound" algorithm is executed against all remaining K level problems that satisfy the size constraint. For the remainder the Relaxation algorithm is used. The scheduling done in Problem Formulation allows each Equation 3.2 cost matrix resulting from the first step of relaxation to be partitioned. The resulting partitions can be solved by any of the four methods, isolated track direct inclusion, isolated track tree evaluation, small group "Branch and Bound" or an additional stage of relaxation as has been fully described.

The partitioning after each level of Lagrangian Relaxation is effective because when a problem is relaxed, the constraint that requires each point to be assigned to only one track is eliminated (for one image at a time). Therefore, two tracks previously linked by contending for one point will be unlinked by the relaxation which permits the point to be assigned to both tracks. The fruitfulness of partitioning increases for lower and lower levels of relaxation.

The following is a more detailed description of the partitioning method. Its application at all but the K level depends upon the relaxation process described in this invention. The recursive partitioning is therefore a distinct part of this invention. The advantage of this method is greatly enhanced by the sparse cost matrix resulting from tracking problems. However the sparse nature of the problem requires special storage and search techniques.

A hypothesis is the combination of the cost element $c_n$ the selection variable $z_n$ and all observations that made up the potential track extension. It can be written as, $h_n = \{c_n, z_n, \{o_{nk} = o_{ki}\{k=1, \ldots, K i \epsilon\{1, \ldots, N_k\}\}\}$ i.e. cost, selection variable and observations in the hypothesis. $n \epsilon \{1, \ldots, N\}$ where N is the total number of hypothesis in problem. While the cost and assignment matrices were previously referenced, these matrices are not effective storage mechanisms for tracking applications. Instead the list of all hypothesis and sets of lists for each dimension that reference the hypothesis set are stored. The hypothetical set in list form is:

$$\{h_n\}_{n=1}^{n=N}$$

For each dimension $k = 1 \ldots K$ there exists a set of lists, with each list element being a pointer to a particular hypothesis:

$$L_{ki} = \{p_{kj} | k_j = 1, \ldots, N_{ki}\} \begin{array}{l} i = N_k, k = K \\ i = 1, k = 1 \end{array}$$

where $N_{ki}$ is number of hypothesis containing the i-th observation from scan k. This structure is a multiply linked list in that any observation is associated with a set of pointer to all hypothesis it participates in, and any hypothesis has a set of pointers to all observations that formed it. (These pointers can be implemented as true pointers or indices depending upon the particular programming language utilized.)

Given this description of the matrix storage technique then the partitioning technique is as follows: Mark the first list $L_{ki}$ and follow out all pointers in that list to the indicated hypothesis $$h_{pki}$$

for $i = 1, \ldots, N_{ki}$. Mark all located hypothesis, and for each follow pointers back the the particular $L_{ok}$ for $k = 1, \ldots, K$. Those L's if not previously marked get marked and also followed out to hypothesis elements and back to L's. When all such L's or h's being located are marked, then an isolated sub-problem has been identified. All marked elements can be removed from the lists and stored as a unique problem to be solved. The partitioning problem then continues by again starting at the first residual L set. When none remain, the original problem is completely partitioned.

Isolated problems can result from one source track having multiple possible extensions or from a set of source tracks contending for some observations. Because one of the indices of k (in our implementation it is $k = 1$) indicate the source track then it is possible to categorize the two problem types by observing if the isolated problem includes more than one L-list from the index level associated with tracks.

SUBSEQUENT TRACK PREDICTION

As noted above, after the points are assigned to the respective tracks, some action is taken such as controlling take-offs and landings to avoid collision, advising airborne aircraft to change course, warning airborne aircraft of an adjacent aircraft in a commercial environment, or aiming and firing an anti-aircraft (or anti-missile) missile, rocket or projectile, or taking evasive action in a military environment. Also, the tracking can be used to position a robot to work on an object. For some or all of these applications, usually the tracks which have just been identified are extended or extrapolated to predict a subsequent position of the aircraft or other object. The extrapolation can be done in a variety of prior art ways; for example, straight line extensions of the most likely track extension hypothesis, parametric quadratic extension of the x versus time, y versus time, etc functions that are the result of the filtering process described earlier, least square path fitting or Kalman filtering of just the selected hypothesis.

The process of gating, filtering, and gate generation as they were previously described require that a curve be fit through observations such that fit of observations to the likely path can be scored and further so that the hypothetical target future location can be calculated for the next stage of gating. In the implementation existing, quadratic functions have been fit through the measurements that occur within the window. A set of quadratics is used, one per sensor measurement. To calculate intercept locations these quadratics can be converted directly into path functions. Intercept times are then calculated by prior methods based upon simultaneous solution of path equations.

The use of the fitted quadratics is not as precise as more conventional filters like the Kalman Filter. They are however much faster and sufficiently accurate for the relative scores required for the Assignment problem.

When better location prediction is required then the assignment problem is executed to select the solution hypothesis and based upon the observations in those hypothesis the more extensive Kalman filter is executed. The result is tremendous computation savings when compared with the Kalman Filter being run on all hypothetical tracks.

Based on the foregoing, apparatus and methods have been disclosed for tracking objects. However, numerous modifications and substitutions can be made without deviating from the scope of the present invention. For example, the foregoing $\Psi$ functions can also be defined as recursive approximation problem in which several values of higher order $u^k$ values are used to eliminate the higher than approximation characteristic of the $\Phi_k$ function. The hill climbing of the $\Psi$ function can be implemented by a high order hill climbing using the enhanced $\Phi_k$ function. Although the result would not be as efficient it seems likely that the method would converge. Therefore, the invention has been disclosed by way of example and not limitation, and reference should be made to the following claims to determine the scope of the present invention.

We claim:

1. Method for tracking objects, said method comprising the steps of:
   repeatedly scanning a region containing a plurality of moving objects and generating a multiplicity of sequential images or data sets of said region, a plurality of points in each of said images or data sets corresponding to a respective plurality of said objects;
   determining in respective figures of merit for assigning said points to said tracks;
   defining a k-dimensional cost function which sums the figures of merit for combinations of assignments from the images or data sets;
   reducing complexity of the cost function by permitting a point to be assigned to more than one track and adding a penalty factor to the cost function when a point is assigned to more than one track;
   iteratively repeating the reducing step and directly solving a resultant penalized cost function;
   defining an auxiliary function at a (k−1)-dimension as a function of lower order penalty factors and a solution at said dimension at which said penalized cost function was solved directly;
   determining a gradient of said auxiliary function, stepping in the direction of said gradient to identify a peak region of said auxiliary function and determining penalty factors at said peak region;
   using said penalty factors at said peak region to assign the points to corresponding tracks;
   taking one or more of the following actions based on the track assignments:
      sending a warning to aircraft or a ground or sea facility,
      controlling air traffic,
      controlling anti-aircraft or anti-missile equipment,
      taking evasive action,
      working on one of the objects.

2. A method as set forth in claim 1 further comprising the following steps which are performed before the step of defining said auxiliary function:
   defining a preliminary auxiliary function at a dimension equal or one greater than the dimension at which said penalized cost function is solved directly, said preliminary auxiliary function being a function of lower order penalty values and a solution at said dimension at which said penalized cost function was solved directly;
   determining a gradient of said preliminary auxiliary function, stepping in the direction of said gradient to identify a peak region of said preliminary auxiliary function and determining penalty factors at said peak region; and
   iteratively repeating said defining step and said gradient determining, stepping and penalty factor determining steps to define auxiliary functions at successively higher dimensions until the auxiliary function at the (k−1) dimension is determined.

3. A method as set forth in claim 2 wherein each of the auxiliary functions equals a solution to the auxiliary function at the next lower dimension plus a solution to a 2-dimensional penalized cost function.

4. A method as set forth in claim 3 wherein
   the first said preliminary auxiliary function is defined at the dimension at which said penalized cost function is solved directly.

5. A method as set forth in claim 1 wherein the figure of merit determining step is performed by:
   extrapolating tracks for said objects; and
   determining the figures of merit based on distances from each of said points to the extrapolated tracks.

6. A method as set forth in claim 1 wherein the scanning step is performed by radar.

7. A method as set forth in claim 1 wherein each reducing step is performed by Lagrangian Relaxation.

8. A method as set forth in claim 3 wherein the penalized cost function is solved directly at the second dimension and further comprising the steps of:
   determining at the second dimension a function equal to minimizing of said penalized cost function and other penalized cost functions at the second dimension;
   determining a gradient of said function and stepping in the direction of said function to identify penalty factors corresponding to a peak region of said function; and
   using said penalty factors corresponding to the peak region of said function to define the preliminary auxiliary functions at a third dimension.

9. A method as set forth in claim 1 further comprising the steps of:
   extrapolating said tracks corresponding to said assignments;
   taking said one or more of said actions based on said extrapolations.

10. A method as set forth in claim 1 further comprising the step of solving said auxiliary function and wherein the gradient is determined at the solution of said auxiliary function.

11. A method as set forth in claim 1 wherein said gradient is based on a plurality of subgradients.

12. A method as set forth in claim 1 wherein the cost determining, defining, reducing, generating, gradient determining, stepping, penalty factor determining, and using steps are performed by a computer.

13. A method as set forth in claim 1 wherein the stepping step is performed by selecting an initial step size, determining a solution to the auxiliary function one step size in the direction of said gradient from a starting point on said auxiliary function, comparing said solution to a solution at said starting point and if said solution at said one step size is larger than the solution at said starting point, increasing said step size and repeating the solution determining and comparing steps using said increased step size.

14. A method as set forth in claim 1 further comprising the following steps performed after the reducing step:
   identifying a subset of said points which are likely assigned to a subset of said tracks based on the respective figures of merit; and
   removing said points from consideration in the respective penalized cost function; and wherein the subsequent reducing steps are performed without considering said subset of points; and further comprising the step of:
   separately assigning said subset of points to tracks of said subset of tracks.

15. Method for tracking objects, said method comprising the steps of:

repeatedly scanning a region containing a plurality of moving objects and generating a multiplicity of sequential images or data sets of said region, a plurality of points in each of said images or data sets corresponding to a respective plurality of said objects;

determining respective figures of merit for assigning said points to said tracks;

defining a k-dimensional cost function which sums the figures of merit for combinations of assignments from the images or data sets;

reducing complexity of the cost function by permitting a point to be assigned to more than one track and adding a penalty factor to the cost function when a point is assigned to more than one track;

after the reducing step, identifying a subset of said points which should be assigned to a subset of said tracks based on the respective figures of merit;

removing said points from consideration in the respective penalized cost function;

separately assigning said subset of points to tracks of said subset of tracks, taking one or more of the following actions based on tracks corresponding to the assignments;
sending a warning to aircraft or a ground or sea facility,
controlling air traffic,
controlling anti-aircraft or anti-missile equipment,
taking evasive action,
working as one of the objects.

16. A method as set forth in claim 15 further comprising the steps of:
repeating the reducing, identifying, removing and separately assigning steps using a penalized cost function which excludes said subset of points.

17. System for tracking objects, said system comprising:
means for repeatedly scanning a region containing a plurality of moving objects and generating a multiplicity of sequential images or data sets of said region, a plurality of points in each of said images or data sets corresponding to a respective plurality of said objects;

means for determining respective figures of merit for assigning said points to said tracks;

means for defining a k-dimensional cost function which sums the figures of merit for combinations of assignments from the images or data sets;

means for reducing complexity of the cost function by permitting a point to be assigned to more than one track and adding a penalty factor to the cost function when a point is assigned to more than one track;

means for iteratively repeating the reducing step and directly solving a resultant penalized cost function;

means for defining an auxiliary function at a (k−1)-dimension as a function of lower order penalty factors and a solution at said dimension at which said penalized cost function was solved directly;

means for determining a gradient of said auxiliary function, stepping in the direction of said gradient to identify a peak region of said auxiliary function and determining penalty factors at said peak region;

means for using said penalty factors at said peak region to assign the points to corresponding tracks;

means for taking one or more of the following actions based on the track assignments;
sending a warning to aircraft or a ground or sea facility,
controlling air traffic,
controlling anti-aircraft or anti-missile equipment,
taking evasive action,
working on one of the objects.

18. Method for tracking objects, said method comprising the steps of:
repeatedly scanning a region containing a plurality of moving objects and generating a multiplicity of sequential images or data sets of said region, a plurality of points in each of said images or data sets corresponding to a respective plurality of said objects;

defining a k-dimensional cost function for combinations of assignments from the images or data sets;

reducing complexity of the cost function by permitting a point to be assigned to more than one track and introducing a penalty factor to the cost function when a point is assigned to more than one track;

iteratively repeating the reducing step and solving a resultant penalized cost function;

defining an auxiliary function at a (k−1)-dimension as a function of penalty factors associated with the reducing steps and a solution to said resultant penalized cost function or another penalized cost function having a similar maximum;

determining a peak region of said auxiliary function and determining penalty factors at said peak region; and using said penalty factors at said peak region to assign the points to corresponding tracks.

19. A method as set forth in claim 18 wherein said auxiliary function (PSI) is defined by:

$$\Psi_k(u^3, \ldots, u^{k-1}; u^k) = \Psi_{k-1}(u^3, \ldots, u^{k-2}; u^{k-1}) + \sum_{i_k=0}^{N_k} u_{i_k}^k$$

where "$\mu$" values are the penalty factors.

20. A method as set forth in claim 18 further comprising the following steps which are performed before the step of defining said auxiliary function:
defining a preliminary auxiliary function at a dimension equal or one greater than the dimension at which said penalized cost function is solved, said preliminary auxiliary function being a function of penalty factors associated with the reducing steps and a solution of said resultant penalized cost function or said other penalized cost function;

determining a peak region of said preliminary auxiliary function and determining penalty factors at said peak region and a solution of a corresponding penalized cost function; and iteratively repeating said defining, said peak region determining, and penalty factor and solution determining steps to define auxiliary functions at successively higher dimensions until the auxiliary function at the (k−1) dimension is determined.

21. A method as set forth in claim 20 wherein said auxiliary functions (PSI) are defined by:

$$\Psi_k(u^3, \ldots, u^{k-1}; u^k) =$$

$$\begin{cases} \Phi_k(u^k, u^{k+1}, \ldots, u^K) & \text{If known} \\ \Psi_{k-1}(u^3, \ldots, u^{k-2}; u^{k-1}) + \sum_{i_k=0}^{N_k} u_{ik}^k & \text{otherwise} \end{cases}$$

where "$\mu$" values are the penalty factors, and PHI is a direct solution of one of said penalized cost functions.

22. A method as set forth in claim 18 wherein the cost function defining step is performed by:
   extrapolating tracks for said objects; and
   determining the figures of merit based on distances from each of said points to the extrapolated tracks.

23. A method as set forth in claim 18 further comprising the steps of:
   taking one or more of the following actions based on the track assignments:
   sending a warning to aircraft or a ground or sea facility,
   controlling air traffic,
   controlling anti-aircraft or anti-missile equipment,
   taking evasive action,
   working on one of the objects.

24. Method for tracking objects, said method comprising the steps of:
   repeatedly scanning a region containing a plurality of moving objects and generating a multiplicity of sequential images or data sets of said region, a plurality of points in each of said images or data sets corresponding to a respective plurality of said objects;
   defining a k-dimensional cost function for combinations of assignments from the images or data sets;
   reducing complexity of the cost function by permitting a point to be assigned to more than one track;
   identifying a subset of said points which should be assigned to a subset of said tracks based on the reduced cost function; and
   separately assigning said subset of points to tracks of said subset of tracks.

25. System for tracking objects, said system comprising:
   means for repeatedly scanning a region containing a plurality of moving objects and generating a multiplicity of sequential images or data sets of said region, a plurality of points in each of said images or data sets corresponding to a respective plurality of said objects;
   means for defining a k-dimensional cost function for combinations of assignments from the images or data sets;
   means for reducing complexity of the cost function by permitting a point to be assigned to more than one track and introducing a penalty factor to the cost function when a point is assigned to more than one track;
   means for iteratively repeating the reducing step and solving a resultant penalized cost function;
   means for defining an auxiliary function at a (k−1)-dimension as a function of penalty factors associated with the reducing steps and a solution to said resultant penalized cost function of another penalized cost function having a similar maximum;
   means for determining a peak region of said auxiliary function and determining penalty factors at said peak region; and
   means for using said penalty factors at said peak region to assign the points to corresponding tracks.

26. A system as set forth in claim 25 further comprising:
   means for taking one or more of the following actions based on the track assignments;
   sending a warning to aircraft or a ground or sea facility,
   controlling air traffic,
   controlling anti-aircraft or anti-missile equipment,
   taking evasive action,
   working on one of the objects.

27. A system as set forth in claim 25 wherein said auxiliary function (PSI) is defined by:

$$\Psi_k(u^3, \ldots, u^{k-1}; u^k) = \Psi_{k-1}(u^3, \ldots, u^{k-2}; u^{k-1}) + \sum_{i_k=0}^{N_k} u_{ik}^k$$

where "$\mu$" values are the penalty factors.

28. A system as set forth in claim 25 wherein said cost function is based on a likelihood that the points are property assigned to the respective tracks.

29. Method for tracking objects, said method comprising the steps of:
   repeatedly scanning a region containing a plurality of moving objects and generating a multiplicity of sequential images or data sets of said region, a plurality of points in each of said images or data sets corresponding to a respective plurality of said objects;
   defining a k-dimensional cost function for combinations of assignments from the images or data sets;
   reducing complexity of the cost function by permitting a point to be assigned to more than one track and introducing a penalty factor to the cost function when a point is assigned to more than one track;
   iteratively repeating the reducing step and solving a resultant penalized cost function; and
   using penalty factors associated with a solution to said resultant penalized cost function or another penalized cost function having a similar maximum, defining an auxiliary function at a higher dimension which is contained within and has a similar maximum as the corresponding penalized cost function.

30. A method as set forth in claim 29 further comprising the steps of:
   taking one or more of the following actions based on the track assignments:
   sending a warning to aircraft or a ground or sea facility,
   controlling air traffic,
   controlling anti-aircraft or anti-missile equipment,
   taking evasive action,
   working on one of the objects,
   surveiling the object.

31. A method as set forth in claim 29 wherein the cost function is based on figures of merit for assigning the points to the tracks.

32. A method as set forth in claim 29 wherein the scanning step is performed by radar.

33. A method as set forth in claim 29 wherein each reducing step is performed by Lagrangian Relaxation.

34. Method for tracking objects, said method comprising the steps of:
   repeatedly scanning a region containing a plurality of moving objects and generating a multiplicity of sequential images or data sets of said region, a plurality of points in each of said images or data sets corresponding to a respective plurality of said objects;

determining respective figures of merit for assigning said points to said tracks;

determining a penalized cost function based on figures of merit for combinations of assignments from the images or data sets and introducing a penalty factor when a point is assigned to more than one track;

solving said penalized cost function at a dimension;

defining an auxiliary function at a higher dimension, said auxiliary function being a less-than approximation of another penalized cost function at the same dimension, and being a function of said penalty factors and a solution to said penalized cost function or another penalized cost function having a similar maximum.

35. A method as set forth in claim 34 further comprising the steps of:

determining a gradient of said auxiliary function;

stepping in the direction of said gradient to identify a peak region of said auxiliary function; and solving said auxiliary function at said peak region.

36. A method as set forth in claim 34 further comprising the step of taking one or more of the following actions based on the track assignments:

sending a warning to aircraft or a ground or sea facility, controlling air traffic, controlling anti-aircraft or anti-missile equipment, taking evasive action, working on one of the objects, surveiling said objects.

37. A method as set forth in claim 35 further comprising the following steps:

using the solution of said auxiliary function to solve said other penalized cost function;

defining another auxiliary function at a higher dimension than the first said auxiliary function, said other auxiliary function being a function of said penalty values and the solution of said other penalized cost function.

38. A method as set forth in claim 37 further comprising the steps of:

determining a gradient of said other auxiliary function;

stepping in the direction of said gradient to identify a peak region of said other auxiliary function; and determining penalty factors at said peak region and a solution of a corresponding penalized cost function.

39. A method as set forth in claim 37 wherein said other auxiliary function equals a solution to said first auxiliary function plus a solution to the first said penalized cost function.

40. A method as set forth in claim 34 wherein the scanning step is performed by radar.

41. A method as set forth in claim 34 wherein the figure of merit determining, penalized cost function solving and auxiliary function defining steps are performed by a computer.

42. A method as set forth in claim 35 wherein the stepping step is performed by selecting an initial step size, determining a solution to the auxiliary function one step size in the direction of said gradient from a starting point on said auxiliary function, comparing said solution to a solution at said starting point and if said solution at said one step size is larger than the solution at said starting point, increasing said step size and repeating the solution determining and comparing steps using said increased step size.

* * * * *